US009291321B2

(12) United States Patent
Jaster

(10) Patent No.: US 9,291,321 B2
(45) Date of Patent: *Mar. 22, 2016

(54) DEVICES AND METHODS FOR COLLECTING DAYLIGHT IN CLEAR AND CLOUDY WEATHER CONDITIONS

(71) Applicant: Solatube International, Inc., Vista, CA (US)

(72) Inventor: Paul August Jaster, Carlsbad, CA (US)

(73) Assignee: SOLATUBE INTERNATIONAL, INC., Vista, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/657,035

(22) Filed: Mar. 13, 2015

(65) Prior Publication Data
US 2015/0184818 A1 Jul. 2, 2015

Related U.S. Application Data

(62) Division of application No. 13/710,902, filed on Dec. 11, 2012, now Pat. No. 8,982,467.

(51) Int. Cl.
F21S 11/00 (2006.01)
G02B 17/00 (2006.01)
(Continued)

(52) U.S. Cl.
CPC ............ F21S 11/007 (2013.01); F21S 11/00 (2013.01); G02B 17/00 (2013.01); G02B 5/04 (2013.01); G02B 5/08 (2013.01); Y10T 29/49826 (2015.01)

(58) Field of Classification Search
CPC ........ F21S 11/00; F21S 11/002; E04D 13/03; Y02B 10/20; G02B 19/0042
USPC .......................................... 359/591–592, 597
See application file for complete search history.

(56) References Cited

U.S. PATENT DOCUMENTS 668,404 A 2/1901 Hanneborg
1,632,254 A 6/1927 Vinogradov
2,121,777 A 7/1938 Bailey et al.
(Continued)

FOREIGN PATENT DOCUMENTS

BE 1 014 530 12/2003
CA 2337293 8/2002
(Continued)

OTHER PUBLICATIONS

"LED Light add on Kit for skylight tubes," Wild Ideas Light Company Ltd., published at least as early as Apr. 2009.
(Continued)

Primary Examiner — Christopher Mahoney
(74) Attorney, Agent, or Firm — Knobbe, Martens, Olson & Bear, LLP

(57) ABSTRACT

Lighting devices and methods for providing daylight to the interior of a structure are disclosed. Some embodiments disclosed herein provide a daylighting device including a tube having a sidewall with a reflective interior surface, a light collecting structure, and a light reflector positioned to reflect daylight into the light collector. In some embodiments, the light collector is associated with one or more light-turning and/or light reflecting structures configured to increase the amount of light captured by the daylighting device. Optical elements may allow for the absorption and/or selective transmission of infrared light away from an interior of the daylighting device.

22 Claims, 22 Drawing Sheets

(51) Int. Cl.
G02B 5/04 (2006.01)
G02B 5/08 (2006.01)

(56) References Cited

U.S. PATENT DOCUMENTS

| | | | |
|---|---|---|---|
| 2,125,410 A | 8/1938 | West | |
| 2,858,734 A | 11/1958 | Boyd | |
| 3,307,303 A | 3/1967 | Bloxsom | |
| 3,936,157 A | 2/1976 | Kapany | |
| 4,018,211 A | 4/1977 | Barr | |
| 4,078,548 A | 3/1978 | Kapany | |
| 4,114,186 A | 9/1978 | Dominguez | |
| 4,126,379 A | 11/1978 | Wu | |
| 4,334,524 A | 6/1982 | McCullough et al. | |
| 4,349,245 A | 9/1982 | Kliman | |
| 4,389,085 A * | 6/1983 | Mori | 359/591 |
| 4,418,684 A | 12/1983 | Sanders et al. | |
| 4,429,952 A | 2/1984 | Dominguez | |
| 4,539,625 A | 9/1985 | Bornstein et al. | |
| 4,557,565 A | 12/1985 | Ruck et al. | |
| 4,615,579 A | 10/1986 | Whitehead | |
| 4,706,649 A | 11/1987 | Hager | |
| 4,720,170 A | 1/1988 | Learn, Jr. | |
| 4,733,505 A | 3/1988 | Van Dame | |
| 4,761,716 A | 8/1988 | Mori | |
| 5,099,622 A | 3/1992 | Sutton | |
| 5,117,811 A | 6/1992 | Taylor | |
| 5,220,462 A | 6/1993 | Feldman | |
| 5,228,772 A | 7/1993 | Mitchell et al. | |
| 5,360,659 A | 11/1994 | Arends et al. | |
| 5,461,496 A | 10/1995 | Kanada et al. | |
| 5,467,564 A | 11/1995 | DeKeyser et al. | |
| 5,493,824 A | 2/1996 | Webster et al. | |
| 5,517,358 A | 5/1996 | Dominguez | |
| 5,528,471 A | 6/1996 | Green | |
| 5,546,712 A | 8/1996 | Bixby | |
| 5,587,847 A | 12/1996 | Chang et al. | |
| 5,596,848 A | 1/1997 | Lynch | |
| 5,648,873 A | 7/1997 | Jaster et al. | |
| 5,650,875 A | 7/1997 | Kanada et al. | |
| D382,247 S | 8/1997 | Lindberg | |
| 5,655,339 A | 8/1997 | Deblock et al. | |
| 5,662,403 A | 9/1997 | Akashi et al. | |
| D389,254 S | 1/1998 | Grubb | |
| 5,729,387 A | 3/1998 | Takahashi et al. | |
| 5,735,262 A | 4/1998 | Houtman | |
| 5,830,548 A | 11/1998 | Andersen et al. | |
| 5,878,539 A | 3/1999 | Grubb | |
| 5,896,712 A | 4/1999 | Chao | |
| 5,896,713 A | 4/1999 | Chao et al. | |
| 5,897,201 A | 4/1999 | Simon | |
| 5,983,581 A * | 11/1999 | DeBlock et al. | 52/200 |
| 5,999,323 A | 12/1999 | Wood | |
| 6,000,170 A | 12/1999 | Davis | |
| RE36,496 E | 1/2000 | Sutton | |
| 6,035,593 A | 3/2000 | Chao et al. | |
| 6,104,854 A | 8/2000 | Masaki et al. | |
| 6,130,781 A | 10/2000 | Gauvin | |
| 6,142,645 A | 11/2000 | Han | |
| 6,178,707 B1 | 1/2001 | Bengtson | |
| 6,219,977 B1 | 4/2001 | Chao et al. | |
| 6,239,910 B1 | 5/2001 | Digert | |
| 6,256,947 B1 | 7/2001 | Grubb | |
| 6,321,493 B1 | 11/2001 | Rillie et al. | |
| 6,363,667 B2 | 4/2002 | O'Neill | |
| 6,363,668 B2 | 4/2002 | Rillie et al. | |
| 6,391,400 B1 | 5/2002 | Russell et al. | |
| 6,412,238 B2 | 7/2002 | Rillie et al. | |
| 6,415,563 B2 | 7/2002 | Rillie | |
| 6,438,803 B2 | 8/2002 | Rillie et al. | |
| 6,438,910 B1 | 8/2002 | Erskine | |
| 6,456,437 B1 | 9/2002 | Lea et al. | |
| 6,493,145 B1 | 12/2002 | Aoki et al. | |
| 6,502,950 B2 | 1/2003 | Signer | |
| RE38,217 E | 8/2003 | De Block et al. | |
| 6,604,329 B2 | 8/2003 | Hoy et al. | |
| 6,623,137 B1 | 9/2003 | Marsonette | |
| 6,655,814 B1 | 12/2003 | Tagawa et al. | |
| 6,691,701 B1 | 2/2004 | Roth | |
| 6,699,558 B1 | 3/2004 | Milburn | |
| 6,827,445 B2 | 12/2004 | Abe et al. | |
| 6,840,645 B2 | 1/2005 | Eisenman et al. | |
| 6,870,673 B2 | 3/2005 | Cromer et al. | |
| 7,040,061 B2 | 5/2006 | Rillie et al. | |
| 7,057,821 B2 | 6/2006 | Zincone | |
| 7,082,726 B2 | 8/2006 | Prenn et al. | |
| 7,134,254 B1 | 11/2006 | Van Gelder | |
| 7,146,768 B2 | 12/2006 | Rillie | |
| 7,159,364 B2 | 1/2007 | Rillie | |
| 7,168,211 B2 | 1/2007 | Prenn et al. | |
| 7,185,464 B2 * | 3/2007 | Bracale | 52/200 |
| 7,222,461 B2 | 5/2007 | Piano et al. | |
| 7,296,908 B1 | 11/2007 | Pickard et al. | |
| 7,322,156 B1 | 1/2008 | Rillie et al. | |
| 7,350,327 B1 | 4/2008 | Logan et al. | |
| 7,395,636 B2 | 7/2008 | Blomberg | |
| 7,438,440 B2 | 10/2008 | Dorogi | |
| 7,455,422 B2 | 11/2008 | Gould et al. | |
| 7,481,552 B2 | 1/2009 | Mayfield, III et al. | |
| 7,501,768 B2 | 3/2009 | Lane et al. | |
| 7,510,305 B2 | 3/2009 | Straton et al. | |
| 7,529,594 B2 | 5/2009 | Walters et al. | |
| 7,546,167 B2 | 6/2009 | Walters et al. | |
| 7,546,168 B2 | 6/2009 | Walters et al. | |
| 7,546,709 B2 | 6/2009 | Jaster et al. | |
| 7,576,647 B1 | 8/2009 | Mudge | |
| 7,585,088 B2 | 9/2009 | Tyson | |
| 7,586,408 B1 | 9/2009 | Mudge | |
| 7,603,184 B2 | 10/2009 | Walters et al. | |
| 7,614,767 B2 | 11/2009 | Zulim et al. | |
| 7,621,656 B2 | 11/2009 | Tyson | |
| 7,622,701 B2 | 11/2009 | Stevens et al. | |
| 7,639,423 B2 | 12/2009 | Kinney et al. | |
| 7,642,501 B1 | 1/2010 | Fassbender et al. | |
| 7,670,021 B2 | 3/2010 | Chou | |
| 7,690,816 B2 | 4/2010 | Tyson et al. | |
| 7,736,014 B2 | 6/2010 | Blomberg | |
| 7,737,640 B2 | 6/2010 | Marques et al. | |
| 7,757,444 B1 | 7/2010 | Halliday | |
| 7,761,260 B2 | 7/2010 | Walters et al. | |
| 7,771,095 B2 | 8/2010 | Dorogi | |
| 7,784,971 B2 | 8/2010 | Dorogi | |
| 7,806,550 B2 | 10/2010 | Tyson et al. | |
| 7,813,041 B2 | 10/2010 | Briee et al. | |
| 7,817,063 B2 | 10/2010 | Hawkins et al. | |
| 7,828,459 B2 | 11/2010 | Rains | |
| 7,839,295 B2 | 11/2010 | Ries, II | |
| 7,845,825 B2 | 12/2010 | Ramer et al. | |
| 7,845,829 B2 | 12/2010 | Shaner | |
| 7,850,342 B2 | 12/2010 | Abdelsamed | |
| 7,863,832 B2 | 1/2011 | Lane et al. | |
| 7,866,855 B2 | 1/2011 | Abdelsamed | |
| 7,883,237 B2 | 2/2011 | Zhang et al. | |
| 7,883,239 B2 | 2/2011 | Rains, Jr. et al. | |
| 7,886,492 B2 | 2/2011 | Kelly et al. | |
| 7,896,521 B2 | 3/2011 | Becker et al. | |
| 7,911,359 B2 | 3/2011 | Walters et al. | |
| 7,918,589 B2 | 4/2011 | Mayfield, III et al. | |
| 7,939,793 B2 | 5/2011 | Rains, Jr. et al. | |
| 7,939,794 B2 | 5/2011 | Rains, Jr. et al. | |
| 7,950,817 B2 | 5/2011 | Zulim et al. | |
| 7,954,281 B2 | 6/2011 | Jaster | |
| 7,957,065 B2 | 6/2011 | Jaster | |
| 7,982,956 B2 | 7/2011 | Kinney et al. | |
| 8,010,319 B2 | 8/2011 | Walters et al. | |
| 8,016,455 B2 | 9/2011 | Paulussen | |
| 8,018,653 B2 | 9/2011 | Jaster | |
| 8,073,303 B2 * | 12/2011 | Whang et al. | 385/146 |
| 8,082,705 B2 | 12/2011 | Jaster et al. | |
| 8,083,363 B2 | 12/2011 | Jaster | |
| 8,098,433 B2 | 1/2012 | Rillie et al. | |
| 8,132,375 B2 | 3/2012 | Jaster | |
| 8,205,385 B2 | 6/2012 | Konstantin | |
| 8,205,386 B2 | 6/2012 | Konstantin | |

(56) References Cited

U.S. PATENT DOCUMENTS

| | | |
|---|---|---|
| 8,245,444 B2 | 8/2012 | Konstantin et al. |
| 8,300,323 B2 | 10/2012 | Hoch et al. |
| 8,371,078 B2 | 2/2013 | Jaster |
| 8,376,600 B2 | 2/2013 | Bartol et al. |
| 8,491,138 B2 | 7/2013 | O |
| 8,958,157 B2 | 2/2015 | Rillie et al. |
| 9,127,823 B2 | 9/2015 | Jaster |
| 2001/0049916 A1 | 12/2001 | Rillie et al. |
| 2002/0060283 A1 | 5/2002 | Jordan et al. |
| 2004/0050380 A1 | 3/2004 | Abe |
| 2005/0039789 A1 | 2/2005 | Kim |
| 2005/0048231 A1 | 3/2005 | Morphet |
| 2005/0078483 A1 | 4/2005 | Bernard et al. |
| 2005/0128728 A1 | 6/2005 | Eisenman et al. |
| 2005/0166490 A1 | 8/2005 | Darmer et al. |
| 2005/0188629 A1 | 9/2005 | Rillie et al. |
| 2005/0243430 A1 | 11/2005 | Cuttle |
| 2005/0252111 A1 | 11/2005 | Prenn et al. |
| 2006/0288645 A1 | 12/2006 | Konstantino et al. |
| 2007/0163732 A1 | 7/2007 | Konstantin et al. |
| 2007/0240705 A1 | 10/2007 | Papadopoulos |
| 2007/0266652 A1 | 11/2007 | Jaster et al. |
| 2007/0271848 A1 | 11/2007 | Wolf et al. |
| 2008/0035275 A1 | 2/2008 | Konstantin |
| 2008/0250733 A1 | 10/2008 | Konstantin |
| 2008/0304263 A1 | 12/2008 | Paulussen |
| 2009/0032102 A1 | 2/2009 | Chen et al. |
| 2009/0113824 A1 | 5/2009 | Rillie |
| 2009/0141487 A1 | 6/2009 | Gould et al. |
| 2009/0322250 A1 | 12/2009 | Zulim et al. |
| 2010/0053971 A1 | 3/2010 | Aggarwal et al. |
| 2010/0091396 A1 | 4/2010 | Hutson et al. |
| 2010/0110684 A1 | 5/2010 | Abdelsamed et al. |
| 2010/0127625 A1 | 5/2010 | Minarczyk et al. |
| 2010/0149804 A1 | 6/2010 | Abdelsamed et al. |
| 2010/0163157 A1 | 7/2010 | Milburn |
| 2010/0232158 A1 | 9/2010 | McCanless |
| 2010/0246193 A1 | 9/2010 | Clifton et al. |
| 2010/0271610 A1 | 10/2010 | Soer et al. |
| 2010/0274945 A1 | 10/2010 | Westrick, Jr. et al. |
| 2011/0019410 A1 | 1/2011 | Ibanez et al. |
| 2011/0032709 A1 | 2/2011 | Tyson et al. |
| 2011/0051413 A1 | 3/2011 | Hand |
| 2011/0067824 A1 | 3/2011 | Konstantin et al. |
| 2011/0103042 A1 | 5/2011 | Tirrell et al. |
| 2011/0110086 A1 | 5/2011 | Barnwell et al. |
| 2011/0127557 A1 | 6/2011 | Ramer et al. |
| 2011/0134649 A1 | 6/2011 | Becker et al. |
| 2011/0242810 A1 | 10/2011 | Lopez Querol et al. |
| 2011/0289869 A1 | 12/2011 | Jaster et al. |
| 2012/0033302 A1 | 2/2012 | Suzuki et al. |
| 2012/0091897 A1 | 4/2012 | O et al. |
| 2012/0230020 A1 | 9/2012 | Rillie et al. |
| 2013/0083554 A1 | 4/2013 | Jaster |
| 2013/0135744 A1* | 5/2013 | Jaster ............... 359/597 |
| 2013/0170045 A1 | 7/2013 | Hsu |
| 2014/0160570 A1 | 6/2014 | Jaster |

FOREIGN PATENT DOCUMENTS

| | | |
|---|---|---|
| CN | 1399095 A | 2/2003 |
| CN | 201035179 Y | 3/2008 |
| CN | 201090939 Y | 7/2008 |
| CN | 101493205 A | 7/2009 |
| DE | 4012333 C1 | 6/1991 |
| DE | 4140851 A1 | 6/1993 |
| EP | 1 306 606 | 5/2003 |
| ES | 2 194 616 | 11/2003 |
| ES | 2 214 950 | 9/2004 |
| GB | 933133 | 8/1963 |
| GB | 2 384 022 | 7/2003 |
| GB | 2 400 885 | 10/2007 |
| JP | 60142413 | 9/1985 |
| JP | 60164704 | 11/1985 |
| JP | 60166906 | 11/1985 |
| JP | H06 111610 | 4/1994 |
| JP | H07 192515 | 7/1995 |
| JP | H08 7619 | 1/1996 |
| JP | 11-160646 | 6/1999 |
| JP | H11 160647 | 6/1999 |
| JP | 2001 184913 | 7/2001 |
| JP | 2002 138634 | 5/2002 |
| JP | 2003 157707 | 5/2003 |
| JP | 2006-228663 A | 8/2006 |
| JP | 2008-082080 | 4/2008 |
| JP | 2009-155427 | 7/2009 |
| KR | 10 0713802 | 5/2007 |
| KR | 10-2009-0113435 | 11/2009 |
| KR | 10 0970152 | 7/2010 |
| KR | 10 2011 0032039 | 3/2011 |
| KR | 10 2011 0062239 | 6/2011 |
| WO | WO 2006/028703 | 3/2006 |
| WO | WO 2009/110283 | 9/2009 |
| WO | WO 2010/070169 | 6/2010 |
| WO | WO 2013/093796 | 6/2013 |

OTHER PUBLICATIONS

"2301 Optical Lighting Film" Technical Specification, Effective Date: Feb. 1, 2000, 3M Specified Construction Products Department, http://www.mmm.com/office.

"3M Daylighting Film DF2000MA", Product Bulletin DF2000MA, Release A, Jun. 2006, 3M Graphics Market Center, St. Paul, MN.

Ge et al., "Heat Loss Calculation of Compound Honeycomb Solar Collection"; Journal of Thermal Science, vol. 2, No. 4, pp. 254-259, Oct. 1993.

Kaushika et al., "Solar Transparent Insulation Materials: A Review"; Renewable and Sustainable Energy Reviews, vol. 7, pp. 317-351, 2003.

Sunflower Corporation, "Sustainable Commercial Daylighting Technical Overview", undated, received on Dec. 11, 2009.

Dulley, James, "Today's Technology and You; Skylight tube solves lighting problems", Illinois Country Living, Apr. 2000.

Sunportal, The most innovative building integrated daylighting system, brochure received on Sep. 22, 2011.

\* cited by examiner

DEVICES AND METHODS FOR COLLECTING DAYLIGHT IN CLEAR AND CLOUDY WEATHER CONDITIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

1. Field

This disclosure relates generally to daylighting and to light collectors used in daylighting systems.

2. Description of Related Art

Daylighting systems typically include windows, openings, and/or surfaces that provide natural light to the interior of a building. Examples of daylighting systems include skylights and tubular daylighting device installations. Various devices and methods exist for receiving daylight into a daylighting device. Certain currently known devices and methods for receiving daylight into a daylighting device suffer from various drawbacks.

SUMMARY

Lighting devices and methods for providing daylight to the interior of a structure are disclosed. Some embodiments disclosed herein provide a daylighting device including a tube having a sidewall with a reflective interior surface, a light collecting assembly, and a light reflector positioned to reflect daylight into the light collector. In some embodiments, the light collector is associated with one or more refractive and/or reflective elements configured to increase the amount of light captured by the daylighting device.

Some embodiments provide an at least partially transparent light-collecting device for directing daylight into a collector base aperture. The device can include a top cover portion and a substantially vertical sidewall portion configured to support the top cover portion above an upper end of the substantially vertical sidewall portion and to define a collector base aperture at a lower end of the substantially vertical sidewall portion. In certain embodiments, the substantially vertical portion has a height that extends between the top cover portion and the collector base aperture, and is configured to receive daylight.

The light-collecting device can include a prismatic element associated with the substantially vertical sidewall portion and configured to turn at least a portion of daylight received by the vertical portion towards the collector base aperture, and a reflector associated with the substantially vertical portion configured to reflect the portion of daylight towards the opening. In certain embodiments, the collector base aperture has a width and is configured to be positioned adjacent to an opening of a building when the light-collecting device is installed as part of a tubular daylighting device installation.

Certain embodiments disclosed herein provide an at least partially transparent light-collecting device configured to direct daylight through a collector base aperture and into an interior of a building when the light-collecting device can be installed on a roof of the building. The device can include a top cover portion and a substantially vertical sidewall portion configured to support the top cover portion above an upper end of the substantially vertical sidewall portion and to define a collector base aperture at a lower end of the substantially vertical sidewall portion, wherein the substantially vertical portion has a height that extends between the top cover portion and the collector base aperture, and wherein the substantially vertical portion can be configured to receive a substantial amount of daylight during midday hours. The device can include a prismatic element associated with the substantially vertical sidewall portion and configured to turn at least a portion of daylight received by the vertical portion towards the collector base aperture, as well as an infrared control element associated with the substantially vertical sidewall portion configured to absorb or transmit at least a portion of infrared (IR) light of the portion of daylight. The light-collecting device can be configured to be positioned over an opening in a roof of a building and can be configured to direct daylight into the opening in the roof when the light-collecting device is installed as part of a daylighting device installation.

The infrared control element can be configured to absorb the at least a portion of infrared light and reradiate the portion of infrared light away from an interior of the light-collecting device. The infrared control element can include a material having high emissivity characteristics, such as a material having an emissivity value of greater than 0.90. In certain embodiments, the sidewall portion can be configured to absorb the reradiated portion of infrared light. The sidewall portion can be configured to transmit the reradiated portion of infrared light. For example, the sidewall portion can include acrylic.

In certain embodiments, the infrared control element can be at least partially secured to the sidewall portion by an adhesive configured to absorb infrared light incident on a surface of the infrared control element. The height of the vertical portion can be greater than the width of the collector base aperture. In certain embodiments, the top cover portion can be substantially flat. In other embodiments, the top cover portion includes a dome-shaped or cone-shaped surface.

The vertical portion can include a plurality of vertically-arranged segments, including a top segment, a middle segment, and a bottom segment. The top, middle, and bottom segments can be each approximately 5 to 10 inches in height. In certain embodiments, the top, middle, and bottom segments can be each a uniform height.

The infrared control element can be at least partially transparent with respect to infrared light. In certain embodiments, the vertical portion is substantially cylindrically shaped. In such embodiments, the infrared control element can be curved and nestingly disposed along an interior surface of the vertical portion. The vertical portion can include a first semi-circle portion that is at least partially transparent, and a second semi-circle portion that is at least partially reflective. For example, the second semi-circle portion can be configured to absorb a substantial portion of infrared light incident on a surface of the second semi-circle portion. In certain embodiments, the second semi-circle portion includes a surface in thermal communication with a high-emissivity material configured to facilitate radiation of heat away from the second semi-circle portion, such paint having an emissivity value greater than or equal to about 0.9. In certain embodiments, the vertical portion can be integrated with an internally reflective tube configured to channel light towards an interior space of the building.

Certain embodiments disclosed herein provide a process of illuminating an interior of a building. The process can include receiving daylight on a substantially vertical surface, turning the daylight towards an opening in a building using a prismatic element disposed within a light-collecting device, and transmitting or radiating a portion of infrared light of the daylight out of the light-collecting device.

The process can include radiating the portion of infrared light out of the light-collecting device at least partially by absorbing the portion of infrared light with an adhesive material and reradiating the portion of infrared light using the adhesive material and/or material having high emissivity characteristics.

Certain embodiments provide a process of manufacturing an at least partially transparent light-collecting device for directing daylight into a building interior. The process can include providing a light collecting device configured to receive daylight on a substantially vertical surface when installed on a building having an opening, disposing a prismatic element within the light collecting device, and disposing an infrared control element adjacent to a wall of the light collecting device. The prismatic element can be configured to turn at least a portion of daylight received on the substantially vertical surface towards the opening. The infrared control element can be configured to transmit or absorb infrared light of the portion of daylight.

Certain embodiments disclosed herein provide an at least partially transparent light-collecting device configured to direct daylight through a collector base aperture and into an interior of a building when the light-collecting device can be installed on a roof of the building. The light-collecting device can include a top cover portion and a substantially vertical sidewall portion configured to support the top cover portion above an upper end of the substantially vertical sidewall portion and to define a collector base aperture at a lower end of the substantially vertical sidewall portion, wherein the substantially vertical portion has a height that extends between the top cover portion and the collector base aperture, and wherein the substantially vertical portion can be configured to receive a substantial amount of daylight during midday hours. The light-collecting device can include a prismatic element associated with the substantially vertical sidewall portion and configured to turn at least a portion of daylight received by the vertical portion towards the collector base aperture and a reflector associated with the substantially vertical sidewall portion configured to reflect at least a portion of visible light of the portion of daylight towards the opening and absorb or transmit at least a portion of infrared (IR) light of the portion of daylight. In certain embodiments, the light-collecting device is configured to be positioned over an opening in a roof of a building and can be configured to direct daylight into the opening in the roof when the light-collecting device can be installed as part of a daylighting device installation.

The reflector can be configured to absorb the at least a portion of infrared light and reradiate the portion of infrared light away from an interior of the light-collecting device. The reflector can include a material having high emissivity characteristics, such as a material having an emissivity value of greater than 0.90. The sidewall portion can be configured to absorb the reradiated portion of infrared light. The sidewall portion can be configured to transmit the reradiated portion of infrared light. For example, the sidewall portion can include acrylic.

In certain embodiments, the reflector is at least partially secured to the sidewall portion by an adhesive configured to absorb infrared light incident on a surface of the reflector. The height of the vertical portion can be greater than the width of the collector base aperture. The vertical portion can include a plurality of vertically-arranged segments, including a top segment, a middle segment, and a bottom segment. For example, the top, middle, and bottom segments can be each approximately 5 to 10 inches in height. In certain embodiments, the top, middle, and bottom segments can be each a uniform height. The reflector can be associated with the top segment and the middle segment. In some embodiments, the reflector is not associated with and/or does not extend to the bottom segment. The reflector can be at least partially transparent with respect to infrared light and/or other wavelengths of radiation that do not contribute to desired illumination of a building.

The vertical portion can be substantially cylindrically shaped. Furthermore, the reflector can be curved and nestingly disposed along an interior surface of the vertical portion. In certain embodiments, the vertical portion includes a first semi-circle portion that can be at least partially transparent, and a second semi-circle portion that can be at least partially reflective. For example, the second semi-circle portion can be configured to absorb a substantial portion of infrared light incident on a surface of the second semi-circle portion. The second semi-circle portion can include a surface in thermal communication with a high-emissivity material configured to facilitate radiation of heat away from the second semi-circle portion, such as material including paint with an emissivity value greater than or equal to about 0.9. In certain embodiments, the vertical portion is integrated with an internally reflective tube configured to channel light towards an interior space of the building.

Certain embodiments disclosed herein provide a process of illuminating an interior of a building. The process can include receiving daylight on a substantially vertical surface, turning the daylight towards an opening in a building using a prismatic element disposed within a light-collecting device, reflecting a portion of visible light of the daylight towards the opening using a reflector, and transmitting or radiating a portion of infrared light of the daylight out of the light-collecting device. The process can include radiating the portion of infrared light out of the light-collecting device at least partially by absorbing the portion of infrared light with an adhesive material and reradiating the portion of infrared light using the adhesive material, such as by using material having high emissivity characteristics.

Certain embodiments provide a process of manufacturing an at least partially transparent light-collecting device for directing daylight into a building interior. The process can include providing a light collecting device configured to receive daylight on a substantially vertical surface when installed on a building having an opening, disposing a prismatic element within the light collecting device, and disposing a reflector adjacent to a wall of the light collecting device. The prismatic element can be configured to turn at least a portion of daylight received on the substantially vertical surface towards the opening. In addition, the reflector can be configured to reflect visible light of the portion of daylight towards the opening, and transmit or absorb infrared light of the portion of daylight.

Certain embodiments disclosed herein provide an at least partially transparent light-collecting device configured to direct daylight through a collector base aperture and into an interior of a building when the light-collecting device can be installed on a roof of the building. The device can include a top cover portion and a substantially vertical sidewall portion configured to support the top cover portion above an upper end of the substantially vertical sidewall portion and to define a collector base aperture at a lower end of the substantially vertical sidewall portion, wherein the substantially vertical portion has a height that extends between the top cover portion and the collector base aperture, and wherein the height of the substantially vertical portion can be greater than a width of the collector base aperture. The device can include a prismatic element configured to turn a portion of light that passes through the top cover portion or substantially vertical sidewall portion. The light-collecting device can be configured to be positioned over an opening in a roof of a building and can be configured to direct daylight into the opening in the roof when the light-collecting device is installed as part of a daylighting device installation.

The device can include a reflector associated with the substantially vertical portion configured to reflect the portion of daylight towards the opening. The collector base aperture can be substantially circular in shape, and the width can be equal to a diameter of the collector base aperture. In certain embodiments, an aspect ratio of the height of the vertical portion to the width of the collector base aperture is greater than 1.2 to 1. For example, the aspect ratio can be greater than 1.5 to 1, 1.7 to 1, 2 to 1, or greater. In certain embodiments, the aspect ratio is in the range of 1.2-1.5 to 1, 1.5-1.75 to 1, or 1.75-2.0 to 1.

The top cover portion can be substantially flat, or can be at least partially dome, or cone-shaped. The vertical portion can include a plurality of vertically-arranged segments, including a top segment, a middle segment, and a bottom segment. In some embodiments, the top segment is associated with first optical elements having first light-turning characteristics and the middle portion is associated with second optical elements having second light-turning characteristics. In some embodiments, light transmitting through the bottom segment is not refracted by light-turning optical elements. In certain embodiments, each of the top, middle, and bottom segments has a height that is greater than or equal to about 5 inches and/or less than or equal to about 10 inches. The top, middle, and bottom segments can each be greater than 10 inches in height. For example, the top, middle, and bottom segments can be each approximately 10 to 18 inches in height. In certain embodiments, the top, middle, and bottom segments are each of uniform height.

In certain embodiments, the vertical portion is substantially cylindrically shaped. The vertical portion can be integrated with an internally reflective tube configured to channel light towards an interior space of the building. The height of the vertical portion can be between 18 and 35 inches, or between 35 and 45 inches. In certain embodiments, the width of the collector base aperture is between 8 and 16 inches, or between 16 and 20 inches, or between 20 and 25 inches.

Certain embodiments disclosed herein provide an at least partially transparent light-collecting device for directing daylight into a building interior. The light-collecting device can include a top cover portion, a base aperture having a width and configured to be disposed adjacent to an opening of a building, and a substantially vertical portion having a height, the vertical portion extending between the top portion and the base aperture and configured to receive daylight when installed on a building. The light-collecting device can include a reflector associated with the vertical portion, the reflector configured to reflect at least a portion of daylight received by the vertical portion towards the opening. The vertical portion can be associated with a prismatic element configured to turn the portion of daylight received by the vertical portion towards the opening. Furthermore, the height of the vertical portion can be greater than the width of the opening of the building.

The vertical portion can have a rectangular cross-sectional shape, a substantially elliptical cross-sectional shape, or any other desired cross-sectional shape. The vertical portion can be constructed out of a single planar sheet formed in the shape of an ellipse, wherein two ends of the sheet can be joined to form a singular vertical seam. Alternatively, the vertical portion can include a plurality of horizontally-arranged curved sheets that can be configured to be joined together to form an ellipse. In certain embodiments, the vertical portion has a substantially triangular cross-sectional shape.

Certain embodiments disclosed herein provide a process of illuminating an interior of a building. The process can include receiving daylight on a substantially vertical surface, turning the daylight towards an aperture lying in a substantially horizontal plane using a prismatic element disposed within a light-collecting device, and reflecting the daylight towards the opening using a reflector. The substantially vertical surface may a height greater than a width of the aperture.

Certain embodiments disclosed herein provide a process of manufacturing an at least partially transparent light-collecting device for directing daylight into a building interior. The process can include providing a light collecting device configured to receive daylight on a substantially vertical surface when installed on a building having an opening and disposing a reflector adjacent to a wall of the light collecting device. The reflector can be configured to reflect the portion of daylight towards the opening through a base aperture of the light collecting device, the substantially vertical surface having a height that can be greater than a width of the base aperture.

Certain embodiments disclosed herein provide a passive light-collecting device for directing sunlight into a building interior. The light-collecting device can include a top cover portion, a base aperture having a width and configured to be disposed adjacent to an opening of a building, and a substantially vertical portion having a height that extends between the top portion and the base aperture and can be configured to receive sunlight. The light-collecting device can be configured to direct a first luminous flux through the base aperture when the light-collecting device is exposed to sunlight at a solar altitude of approximately 30 degrees, and to direct a second luminous flux through the base aperture when the light-collecting device is exposed to sunlight at a solar altitude of approximately 70 degrees, wherein the first luminous flux is greater than or equal to about 75% of the second luminous flux when the light-collecting device is exposed to substantially only direct sunlight on a clear day.

The light-collecting device can include a prismatic element associated with the vertical portion and configured to turn at least a portion of sunlight received by the vertical portion towards the base aperture. The light-collecting device can include a reflector associated with the vertical portion configured to reflect the portion of sunlight towards the base aperture. In certain embodiments, the height of the vertical portion can be greater than the width of the base aperture.

In certain embodiments, the top cover portion is substantially flat. The top cover portion can include a dome-shaped surface, a cone-shaped surface, a planar surface, a faceted surface, another surface shape, or a combination of surface shapes. The top cover can be associated with a second prismatic element configured to turn sunlight incident on the top cover towards the base aperture. The second luminous flux can be greater than 18,000 lumens.

In certain embodiments, the vertical portion is substantially cylindrically shaped. The vertical portion can include a plurality of vertically-arranged segments, including a top segment, a middle segment, and a bottom segment. For example, the top segment can be associated with a first prismatic element having first light-turning characteristics and the middle portion can be associated with a second prismatic element having second light-turning characteristics. The bottom segment may not be associated with light-turning optical elements. The top, middle, and bottom segments can be each approximately 5 to 10 inches in height, and may each be of uniform height.

The vertical portion can be integrated with an internally reflective tube configured to channel light towards an interior space of the building. The height of the vertical portion can be between 20 and 25 inches, or between 35 and 45 inches. In certain embodiments, the reflector is disposed adjacent to an interior surface of the substantially vertical portion. Alternatively, the reflector can be disposed adjacent to an outer surface of the substantially vertical portion.

Certain embodiments disclosed herein provide a passive light-collecting device for directing sunlight into a building interior. The light-collecting device can include a top cover portion, a base aperture having a width and configured to be disposed adjacent to an opening of a building, and a substantially vertical portion having a height that extends between the top portion and the base aperture and can be configured to receive sunlight. The light-collecting device can be configured to direct a first luminous flux through the base aperture when the light-collecting device is exposed to sunlight at a solar azimuth of approximately 45 degrees and a first solar altitude, and direct a second luminous flux through the base aperture when the light-collecting device can be exposed to sunlight at a solar azimuth of approximately 0 degrees, wherein the first luminous flux can be greater than or equal to about 75% of the second luminous flux when the light-collecting device can be exposed to substantially only direct sunlight on a clear day.

The light-collecting device can include a prismatic element associated with the vertical portion and configured to turn at least a portion of sunlight received by the vertical portion towards the base aperture. The light-collecting device can include a reflector associated with the vertical portion configured to reflect the portion of sunlight towards the base aperture. In certain embodiments, the second luminous flux can be greater than 18,000 lumens.

Certain embodiments disclosed herein provide an at least partially transparent light-collecting device for directing sunlight into a building interior. The light-collecting device can include a top cover portion, a base aperture having a width and configured to be disposed adjacent to an opening of a building, and a substantially vertical portion having a height that extends between the top portion and the base aperture and can be configured to receive sunlight. The light-collecting device can be configured to direct a first luminous flux through the base aperture when the light-collecting device can be exposed to sunlight at a solar altitude of approximately 30 degrees and a solar azimuth of approximately 45 degrees, and direct a second amount of light through the base aperture when exposed to sunlight at a solar altitude of approximately 70 degrees and a solar azimuth of approximately 0 degrees, wherein the first luminous flux can be greater than or equal to about 75% of the second luminous flux when the light-collecting device can be exposed to substantially only direct sunlight on a clear day.

The light-collecting device can include a prismatic element configured to turn at least a first portion of sunlight received by the vertical portion towards the base aperture. The light-collecting device can include a reflector associated with the vertical portion, the reflector configured to reflect at least a second portion of the sunlight received by the vertical portion towards the base aperture.

In certain embodiments, the top cover can be associated with a second prismatic element configured to turn sunlight incident on the top cover towards the base aperture, and can be substantially flat. The vertical portion may have a substantially rectangular, elliptical, triangular, hexagonal, pentagonal, or octagonal cross-sectional shape.

Certain embodiments disclosed herein provide a process of illuminating an interior of a building. The process can include receiving first sunlight having a solar altitude of approximately 30 degrees on a vertical surface, directing the first sunlight into an opening in a building, receiving second sunlight having a solar altitude of approximately 70 degrees on the vertical surface, and directing the second sunlight into the opening in the building. The first sunlight and the second sunlight can include direct sunlight, and the first sunlight can include a luminous flux that is greater than or equal to about 75% of a luminous flux of the second sunlight when said receiving the first sunlight and receiving the second sunlight are performed on a clear day.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION OF CERTAIN EMBODIMENTS

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in a manner or order that can be helpful in understanding certain embodiments; however, the order of description should not be construed to imply that these operations are order-dependent. Additionally, the structures, systems, and/or devices described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can be taught or suggested herein.

Figure 1:
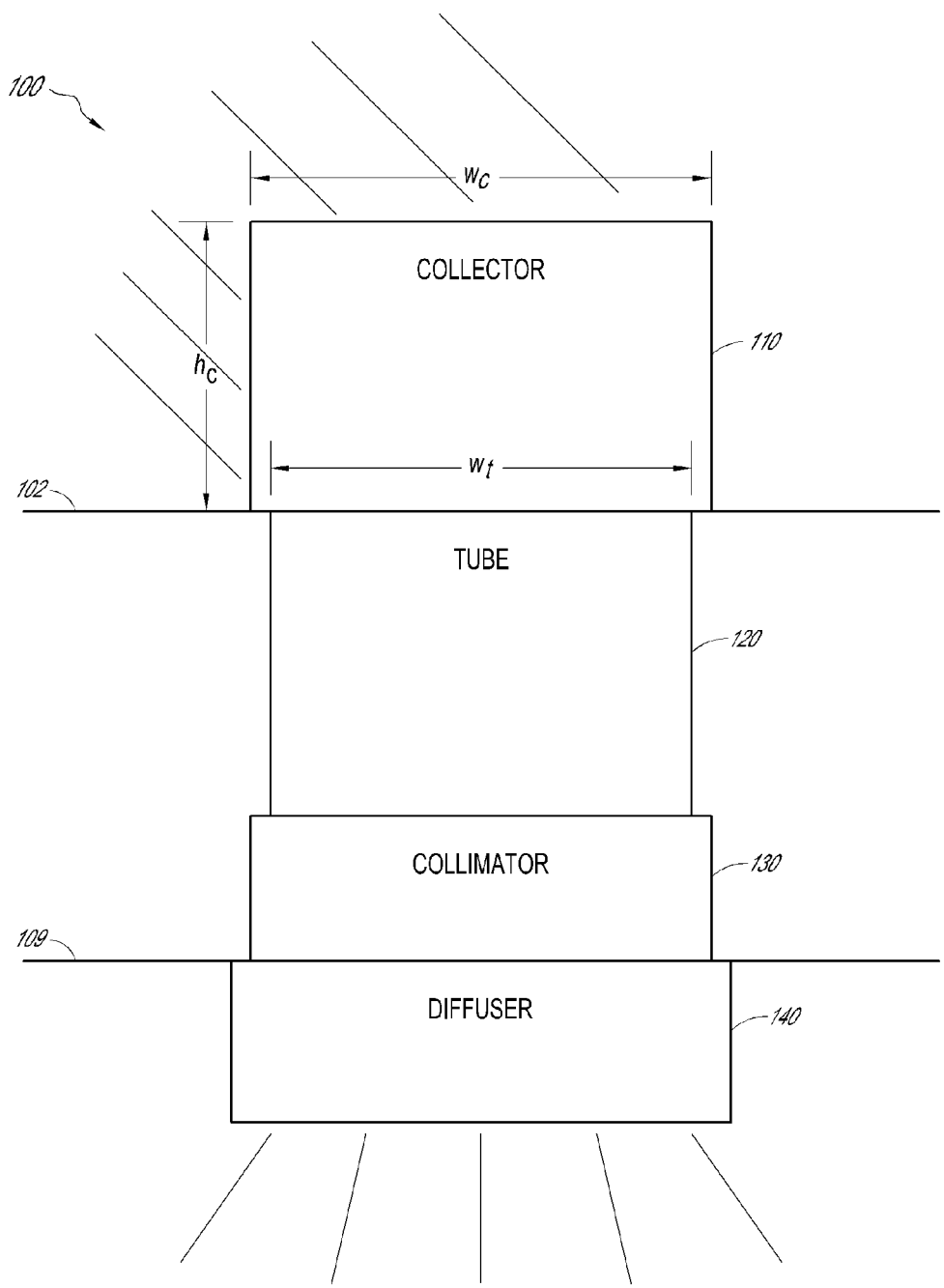
FIG. 1 illustrates a block diagram representing an embodiment of a daylighting device.

FIG. 1 depicts a block diagram representing an embodiment of a daylighting device 100. The daylighting device 100 can be a passive light-collection and distribution system for providing daylight to an interior of a building or other structure. The daylighting device 100 includes a light collector 110 which is exposed, either directly or indirectly to a source of light, such as, for example, the Sun. Light enters the light collector and propagates into a tube 120. For example, the light may enter the light collector 110 through a substantially vertical daylight-collection surface and/or top cover portion of the light collector. The tube 120 provides a channel, or pathway, between the light collector 110 and a light-aligning structure 130. The interior surface of the tube 120 is at least partially reflective. In some embodiments, at least a portion of the interior surface of the tube 120 is specularly reflective.

As used herein, the terms "substantially vertical" and "vertical" are used in their broad and ordinary sense and include, for example, surfaces that are generally perpendicular to the ground, surfaces that are generally perpendicular to a horizontal plane, and/or surfaces that deviate by less than about 10° from a plane perpendicular to the ground and/or a horizontal plane. Such surfaces can be planar, curved, or irregularly shaped while still being substantially vertical so long as an elongate dimension of a surface is generally vertical. The terms "substantially horizontal" and "horizontal" are used in their broad and ordinary sense and include, for example, surfaces that are generally parallel to the ground, surfaces that are generally parallel to the roof of a building, and/or surfaces that deviate by less than or equal to about 10° from a plane parallel to the ground and/or a roof. Such surfaces can be planar, curved, or irregularly shaped while still being substantially horizontal so long as an elongate dimension of a surface is generally horizontal.

The light collector permits exterior light, such as natural light, to enter the interior of the reflective tube 120. The light collector 110 can have one or more components. For example, the light collector 110 can include a transparent dome, a prismatic dome, other prismatic elements, one or more light turning structures or elements, a durable cover, one or more reflective surfaces (e.g., positioned inside or outside of a portion of the collector 110), other optical elements, other components, or a combination of components. At least some components of the light collector can be configured to be positioned on the roof 102 of the building or in another suitable area outside the building. The light collector 110 can include a transparent cover installed on the roof 102 of the building or in another suitable location. The transparent cover can be cylindrically shaped, dome-shaped, or can include any other suitable shape or combination of shapes, and can be configured to capture sunlight during certain periods of the day. In certain embodiments, the cover keeps environmental moisture and other material from entering the tube. The cover can allow exterior light, such as daylight, to enter the system.

In the example embodiments disclosed, the measure $h_e$ represents a height of a substantially vertical sidewall portion of the light collector 110. In certain embodiments, the sidewall portion presents a substantially vertical daylight-collection surface through which daylight may enter the daylighting device 100. The measure $w_e$ represents a width of a portion of the collector, such as the width of the base or top portions of the collector 110. In certain embodiments, the width of the collector is substantially uniform over its height $h_e$. The width $w_e$ of the collector at its base can be greater than the width of the tube 120 at a point near the collector base. In some embodiments, a daylight device is configured such that a width of the tube into which daylight is directed, at least in a region disposed in proximity to the collector base, is less than the height $h_e$ of the collector. The width of the tube $w_t$ may represent a width of a target area to which the light collector 110 is configured to direct daylight entering the collector. The term "target area" is used herein according to its broad and ordinary meaning and can be used to refer to an area through which a daylight collector is configured to direct daylight in order for the daylight to enter an internally-reflective tube between a roof structure and interior room of a building.

The relationship between the height of the collector and the width of the tube or width of the target area of the collector can be characterized using a ratio between the quantities that will be referred to herein as the aspect ratio. In general, the aspect ratio refers to the ratio between the height of the collector and the width of the tube with which the collector is configured to be used. For example, in some embodiments, the height $h_e$ of the collector, as compared to the width $w_t$ of the tube/target area 120, or width $w_e$ of the collector 110, can have an aspect ratio of approximately 1.2 to 1, or greater. The term "collector" is used herein according to its broad and ordinary meaning and includes, for example, a cover, window, or other component or collection of components, configured to direct daylight into an opening of a building. A collector can include optical elements that refract and/or reflect daylight such that the luminous flux of natural light entering a building is greater than if an opening in the building included a fenestration apparatus without optical elements.

In some embodiments, the cover includes a light collection system configured to enhance or increase the daylight entering the tube 120. The collector 110 can include one or more optical elements, either integrated or non-integrated with respect to the cover, configured to turn light entering one or more portions of the collector 110 generally in the direction of the tube 120, or opening in the building. The light collector 110 can include a top cover. For example, the top cover can be clear or include prisms for refracting daylight toward the collector base aperture. The prisms can be fabricated into the cover material or can be formed in a separate prismatic element placed beneath or above a clear dome. As used herein, prismatic element is used in its broad and ordinary sense and includes, for example, prismatic films, molded prismatic assemblies, extruded prismatic materials, another prismatic material, or a combination of materials.

The daylighting device 100 can be configured such that light enters the collector 110 and proceeds through the tube 120, which can be internally reflective, thereby allowing light to propagate through the tube to a targeted area of the building. An auxiliary lighting system (not shown) can be installed in the daylighting device 100 to provide light from the tube to the targeted area when daylight is not available in sufficient quantity to provide a desired level of interior lighting.

The collimator 130 can be configured such that light that would otherwise enter the diffuser at undesirable angles is turned to a more desirable angle. For example, the collimator 130 can ensure that light passing through the daylighting device will exit the daylighting device at an exit angle of less than or equal to about 45 degrees from vertical, or at a substantially vertical orientation, when the diffuser 140 is in a horizontal arrangement. In some embodiments, the collimator 130 may ensure that light passing through the daylighting device will exit the daylighting device at an exit angle of less than or equal to about 45 degrees from a longitudinal axis of the daylighting device or a portion of the daylighting device. In certain embodiments, the collimator 130 is configured to reduce or prevent light from exiting the daylighting device 100 at an angle of between about 45 degrees and about 60 degrees from vertical. In this manner, the collimator 130 may reduce or eliminate glare and visibility issues that light exiting a lighting fixture between those angles can cause.

The daylighting device 100 includes a light-diffusing structure, or diffuser 140. The diffuser 140 spreads light from the tube into the room or area in which it is situated. The diffuser 140 can be configured to distribute or disperse the light generally throughout a room or area inside the building. Various diffuser designs are possible.

When the daylighting device 100 is installed, the tube 120 can be physically connected to, or disposed in proximity to, the light-aligning structure, or collimator 130, which is configured to turn light propagating through the daylighting device such that, when light exits the daylighting device 100 and/or enters a diffuser 140, the light has increased alignment characteristics, as compared to a device without a collimator. In some embodiments, a substantial portion of light propagating through the daylighting device 100 may propagate within the daylighting device at relatively low angles of elevation from a horizontal plane of reference. Such angles of propagation may, in some situations, cause the light to have undesirable properties when it exits the daylighting device. For example, the optical efficiency of a diffuser substantially positioned within a horizontal plane can be substantially reduced when light is incident on the diffuser at low angles of elevation from the horizontal plane. As another example, light that is incident on a diffuser at low angles of elevation can result in light exiting the daylighting device at an exit angle of greater than or equal to about 45 degrees from vertical. Light exiting a daylighting device at such angles can create glare and visibility issues in the area or room being illuminated.

Though the embodiment depicted in FIG. 1 is described with reference to one or more features or components, any of the described features or components can be omitted in certain embodiments. Furthermore, additional features or components not described can be included in certain embodiments in accordance with the device shown in FIG. 1.

Figure 2:
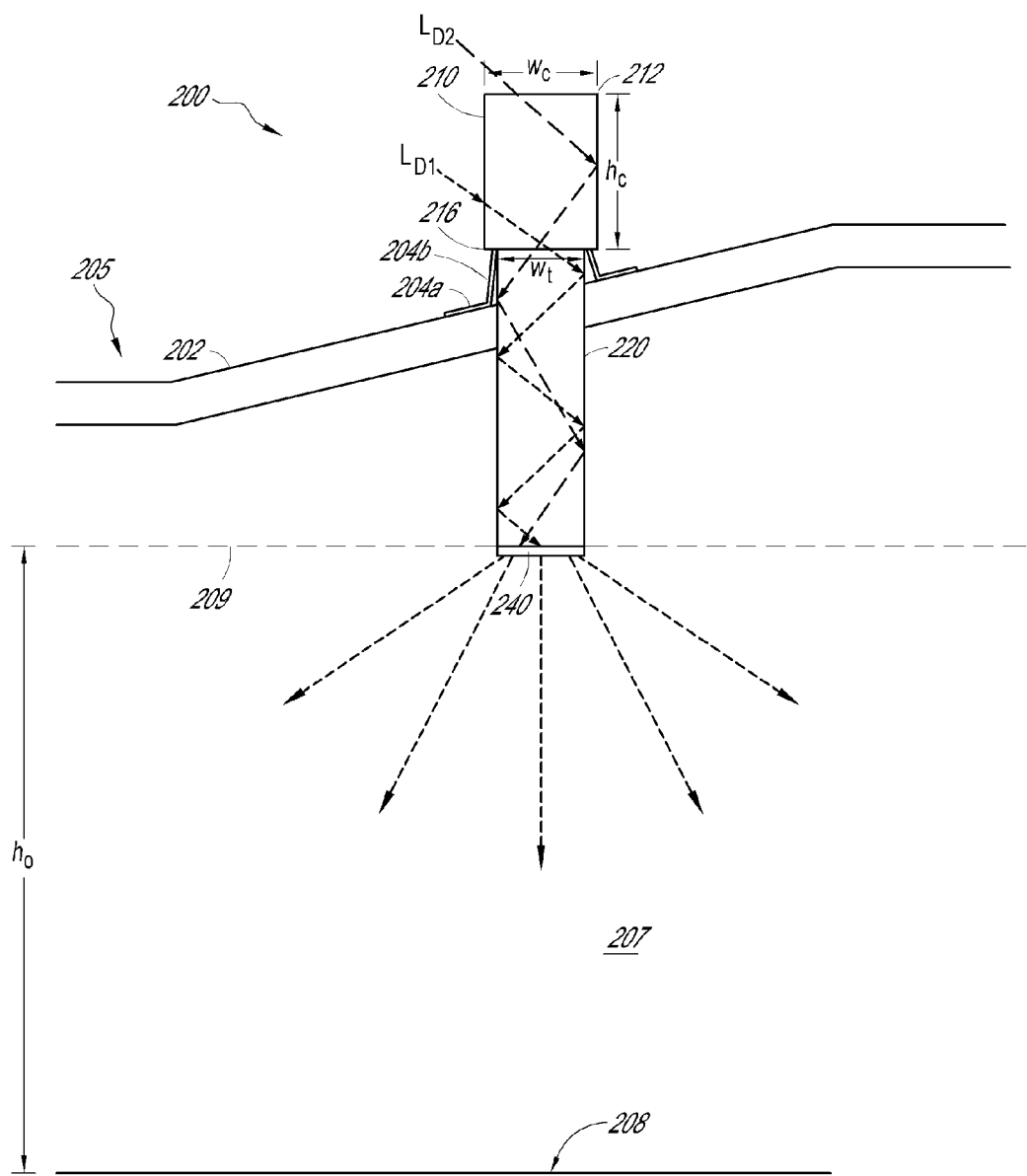
FIG. 2 illustrates a cutaway view of an example of a daylighting device installed in a building for illuminating an interior room of the building.

FIG. 2 shows a cutaway view of an example of a daylighting device 200 installed in a building 205 for illuminating, with natural light, an interior room 207 of the building. The daylighting device 200 can be suited for use in commercial, high-bay applications, such as in structures or buildings having ceilings above twenty feet high. For example the distance $h_0$ between the floor 208 and a ceiling plane 209 can be in the range of approximately 20-28 feet. The daylighting device 200 can be configured to improve the performance of a light collection system through the use of a light collector 210, wherein the light collector 210 incorporates, or is associated with, one or more passive optical elements. The daylighting device 200 can be particularly configured for applications that operate within an approximately six-hour window during which daylight is most intense. For example, depending on geographical location of the building 202, among possibly other things, the daylighting device 200 can be configured to capture desirable amounts of daylight between the hours of 9:00 am and 3:00 pm.

The light collector 210 can be mounted on a roof 202 of the building and may facilitate the transmission of natural light into a tube 220. In certain embodiments, the collector 210 is disposed on a pitched roof. In order to compensate for the pitch in the roof, the collector 210 can be mounted to the roof 202 using a flashing 204. The flashing can include a flange 204a that is attached to the roof 202, and a curb 204b that rises upwardly from the flange 204a and is angled as appropriate for the cant of the roof 202 to engage and hold the collector 210 in a generally vertically upright orientation. Other orientations are also possible. In certain embodiments, at least a portion of the roof 202 is substantially flat.

The light collector 210 has a height $h_e$ and is disposed adjacent to a tube opening having a width, or diameter, $W_t$. The tube opening may provide a target area into which the light collector 210 is configured to direct daylight. As used herein, the height $h_e$ may refer to the height of a substantially vertical sidewall portion of the collector 210, or may refer to the height of the collector 210 including the height of a cover portion disposed above the vertical portion. In certain embodiments, the substantially vertical sidewall portion may provide a vertical daylight-collection surface for daylight incident on certain portions of the collector 210. In certain embodiments, the height $h_e$ is approximately 20-26 inches. In other embodiments, the height $h_e$ can be approximately 35-45 inches. In addition, the width $w_t$ of the tube opening can be between 15-30 inches. For example, in an embodiment, the height $h_e$ of the collector 210 is approximately 42 inches and the width $w_t$ of the tube opening is approximately 25 inches. The collector 210 may have a width $w_e$ slightly greater than the width $w_t$ of the tube opening such that when the light collector is disposed above the tube opening, a lip of the collector 210 extends beyond the width of the tube opening. For example, the collector 210 may have a 1-inch lip around a circumference or perimeter of the tube opening, such that the width $w_e$ of the collector 210 is approximately 2 inches greater than the width of the tube opening $W_t$. The height $h_e$ of the collector 210 and the width $w_t$ of the tube opening can be configured to obtain a desirable aspect ratio that provides satisfactory performance characteristics. In certain embodiments, the aspect ratio of height $h_e$ to width $w_t$ is approximately 1.7:1. In some embodiments, the aspect ratio is greater than or equal to about 1.2:1 and/or less than or equal to about 2:1. Such aspect ratios, in connection with daylighting device features described herein, may provide improved daylight capturing characteristics.

The tube 220 can be connected to the flashing 204 and can extend from about a level of the roof 202 through a ceiling level 209 of the interior room 207. The tube 220 can direct light $L_{D2}$ that enters the tube 220 downwardly to a light diffuser 240, which disperses the light in the room 207. The interior surface of the tube 220 can be reflective. In some embodiments, the tube 220 has at least a section with substantially parallel sidewalls (e.g., a generally cylindrical inside surface). Many other tube shapes and configurations are possible. The tube 220 can be made of metal, fiber, plastic, other rigid materials, an alloy, another appropriate material, or a combination of materials. For example, the body of the tube 220 can be constructed from type 1150 alloy aluminum. The shape, position, configuration, and materials of the tube 220 can be selected to increase or maximize the portion of daylight $L_{D1}$, $L_{D2}$ or other types of light entering the tube 220 that propagates into the room 207.

The tube 220 can terminate at, or be functionally coupled to, a light diffuser 240. The light diffuser 240 can include one or more devices that spread out or scatter light in a suitable manner across a larger area than would result without the diffuser 240 or a similar device. In some embodiments, the diffuser 240 permits most or substantially all visible light traveling down the tube 220 to propagate into the room 207. The diffuser can include one or more lenses, ground glass, holographic diffusers, other diffusive materials, or a combination of materials. The diffuser 240 can be connected to the tube 220, or other component of the daylighting device 200, using any suitable connection technique. In some embodiments, the diffuser 240 is located in the same general plane as a ceiling level 209 of the building, generally parallel to the plane of the ceiling level 209, or near the plane of the ceiling level 209. In certain embodiments, the building 205 has an open ceiling, exposing structure associated with the roof 202. For example, certain high-bay buildings may have open-ceiling configurations, exposing structural I-beams and/or the like. In an open ceiling configuration, the diffuser 240 can be disposed adjacent to a ceiling-level plane 209, rather than a physical ceiling structure.

In certain embodiments, the diameter of the diffuser 240 is substantially equal to the diameter of the tube 220, slightly greater than the diameter of the tube 220, slightly less than the diameter of the tube 220, or substantially greater than the diameter of the tube 220. The diffuser 240 can distribute light incident on it toward a lower surface below the diffuser (e.g., the floor 208) and, in some room configurations, toward an upper surface of the room 207. In some embodiments, a diffuser 240 provides substantial amounts of both direct diffusion and indirect diffusion. In some embodiments, the diffuser 240 reduces the light intensity in one or more regions of the room interior 207.

One or more daylighting devices configured according to the embodiment described with respect to FIG. 2 may increase illumination of a building, or decrease the number of devices required to achieve a desired amount of light infusion into the building. For example, certain embodiments described herein may improve performance and/or reduce the number of required devices by 20-30%.

The daylighting device 200 can be configured to sustain significant physical stress without substantial structural damage. For example, in certain embodiments, the daylighting device 200 is configured to withstand a drop test, wherein a bag of sand having particular weight/size characteristics is dropped onto the top of the device from a minimum height. To pass such test, the device can be required to withstand the fall test without allowing the bag to fall through the opening in the building. In some embodiments, a daylighting system is configured to meet standards and/or regulations promulgated by standards organizations and/or government agencies that are designed to improve the safety of rooftop environments containing daylighting fixtures. For example, certain embodiments are configured to meet the Federal Occupational Safety and Health Administration (OSHA) regulations, which provide, for example, that skylight screens shall be of such construction and mounting that they are capable of withstanding a load of at least 200 pounds applied perpendicularly to a surface. Daylighting devices can be constructed to meet regulatory standards. In certain embodiments, one or more portions of the flashing 204, and/or collector 210 can be constructed and/or mounted such that the collector 210 is not damaged to the extent that an opening or aperture providing an ingress into the building interior 207 is created therein, when a 267-lb. sand bag, having an approximately 5.5" bull nose, is dropped generally perpendicularly to a plane of the roof and/or to a top surface of the collector 210 from a height of about 36" above the roof onto the center of the top portion of the daylight collector.

Figure 3:
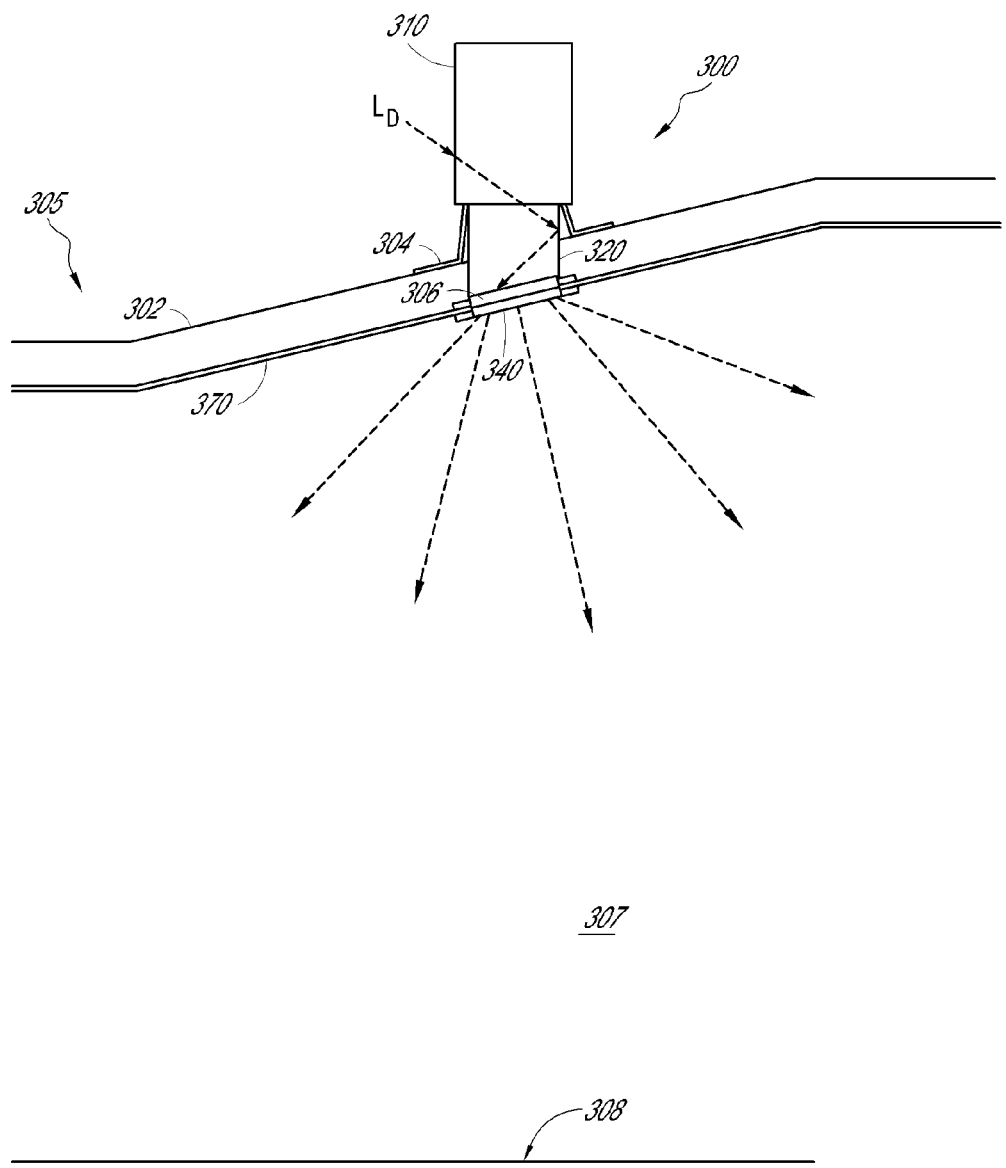
FIG. 3 illustrates a cutaway view of an example of a daylighting device installed in a building for illuminating an interior room of the building.

FIG. 3 shows a cutaway view of an example of a daylighting device 300 installed in a building 305 for illuminating, with natural light, an interior room 307 of the building. The daylighting device 300 includes a light collector 310 mounted on a roof structure 302 of the building 305 that allows natural light to enter a tube 320. In the depicted embodiment, the daylighting device 300 includes an insulation structure, or layer, 306 disposed adjacent to, or within, the tube 320. The insulation structure 306 can be configured to reduce a rate of thermal energy transfer between the interior of the daylighting device 300 and the room 307. For example, the insulation structure 306 can be disposed adjacent to a diffuser 340, such as between the diffuser 340 and the interior of the tube 320. The insulation structure 306 can be disposed at any other suitable position, such as near the top of the tube 320, near the level of a ceiling, or near the level of the collector 310. In some embodiments, the insulation structure 306 can be positioned at the same level as an insulation layer found in the building, and can be positioned to provide a substantially contiguous layer of insulation together with the building insulation layer. The daylighting device 300 can also include insulation structures disposed in various positions or locations. The position(s) of the insulation structure(s) 306 can be selected to produce any desired thermal energy transfer characteristics.

In the embodiment depicted in FIG. 3, the diffuser 340 is disposed adjacent to, and in a substantially parallel alignment with, a surface 370 of the roof structure 302. As shown, the tube 320 may extend from the light collector 310 and through at least a portion of the roof structure 302, without extending substantially into the interior room space 307. In certain embodiments, the daylighting device 300 can include a light collector configured to provide light to the interior room 307 without the use of a tube 320. For example, the light collector 310 may extend through the roof structure 302, and connect directly with the diffuser 340.

Figure 4:
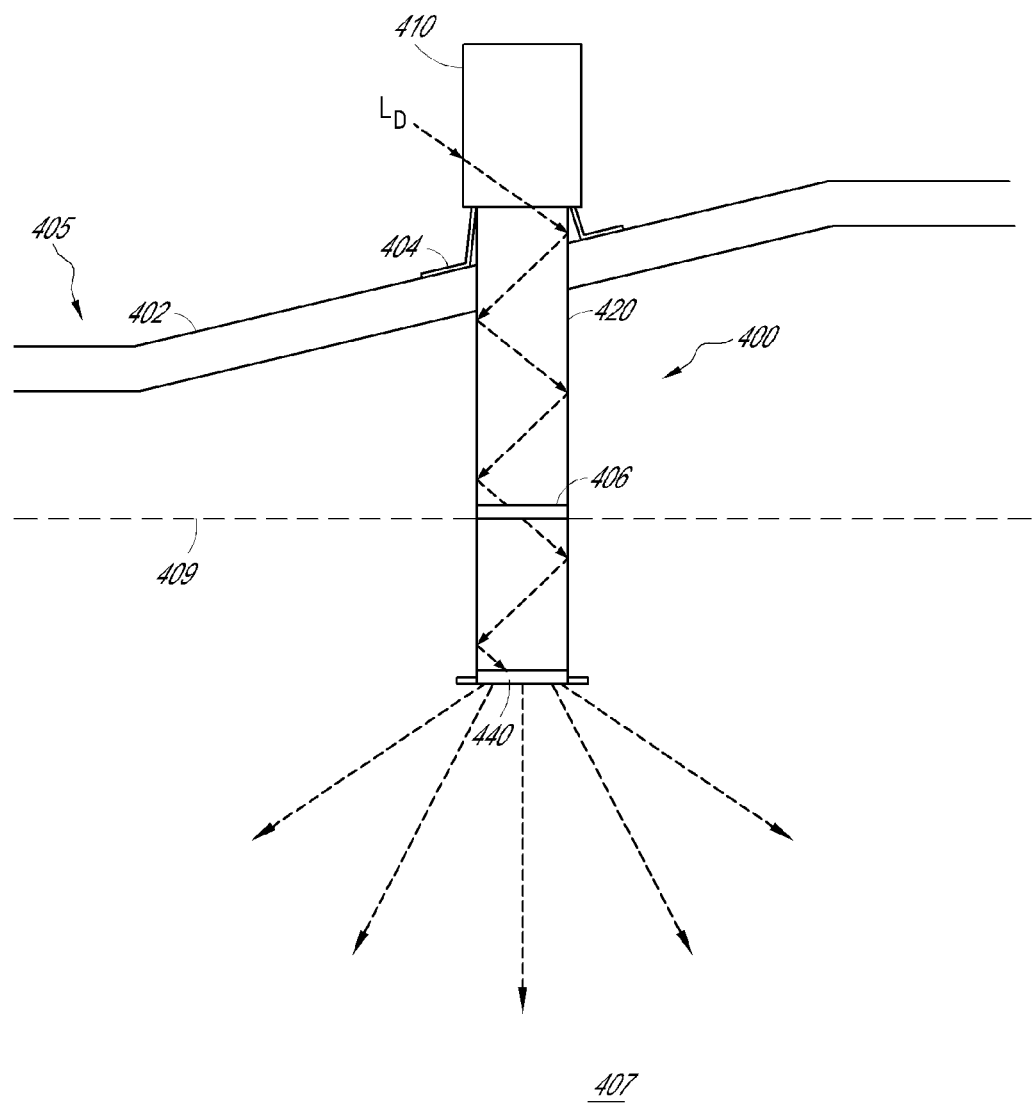
FIG. 4 illustrates a cutaway view of an example of a daylighting device installed in a building.

FIG. 4 shows a cutaway view of an example of a daylighting device 400 installed in a building 405. The daylighting device 400 includes a light collector 410 mounted on a roof 402 of the building 405 that allows natural light to enter a tube 420. In certain building applications, such as high-bay building applications, light provided by a daylighting system can be at least partially blocked or undesirably redirected by one or more obstructions disposed in the vicinity of the system's lower perimeter, or along the path of light between the system and a desired area of illumination. The daylighting device 400 can be configured to extend below one or more possible obstructions, or low enough to reduce the effects of one or more obstructions on lighting performance. In certain embodiments, the effect of obstructions on lighting performance is reduced by incorporating a daylighting device that maintains a substantial portion of its transmitted light within a cone half angle of less than approximately 40-45°. In the depicted embodiment, the tube extends through the roof 402, and a distance d below a ceiling level 409. The ceiling level 409 can be a physical ceiling structure, or may represent a ceiling level in an open-ceiling building configuration. The ceiling level can be, for example, at approximately the same level as one or more I-beam structures, or other building structure. In an embodiment including a physical ceiling structure 409, the daylighting device 400 can include an insulation structure disposed adjacent to the ceiling level 409.

In certain embodiments, the daylighting device 400 includes a thermal insulation subsystem, or portion 406, that substantially inhibits thermal communication between the interior 407 of a structure and the outside environment. The thermal insulation subsystem can have any suitable configuration, such as, for example, one of the configurations disclosed in U.S. Patent Application Publication No. 2011/0289869, entitled "Thermally Insulating Fenestration Devices and Methods," the entire contents of which are incorporated by reference and made a part of this specification.

The tubular daylighting device can include a thermal break in any materials or components of the daylight device that have high thermal conductivity. For example, a spacer or gap in the sidewall of the tube can be positioned near a thermal insulating portion and the thermal insulating portion and thermal break can be configured to form a substantially continuous layer between the building interior and the exterior environment. In certain embodiments, the insulating portion and thermal break are disposed in the same plane as other building insulation material, such as fiberglass or the like.

Figure 5:
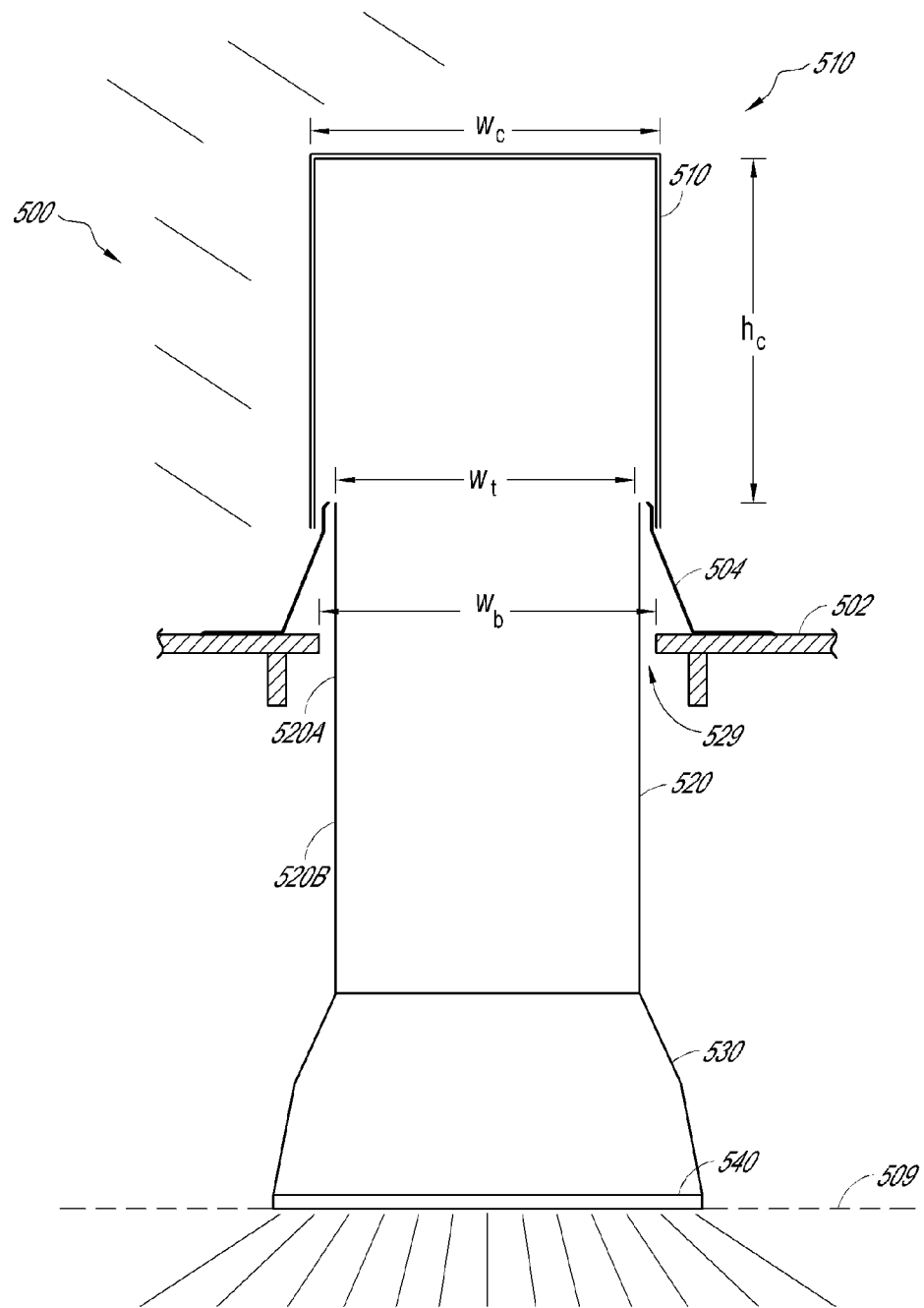
FIG. 5 illustrates an embodiment of a daylighting device incorporating a collimator at a terminal portion of the daylighting device.

FIG. 5 illustrates an embodiment of a daylighting device 500 incorporating a collimator 530 at a bottom, or terminal portion of the daylighting device 500. The bottom portion of the daylighting device 500 can include one or more light diffusing or spreading devices 540, thermal insulation devices, or combination of devices referenced herein. Collimator 530 represents an embodiment of the collimator 130 shown in FIG. 1. The collimator 530 serves to generally align rays of light propagating through the daylighting device 500 so that light reaches the diffuser 540 at greater angles with respect to the base of the diffuser 540 than it would without a collimator. The collimator 530 can be a multi-segment, or multi-stage, collimator. In some embodiments, the collimator 530 is a single-stage collimator. In certain embodiments, sunlight entering the tube will have a solar altitude (angle from the horizon) that will remain substantially the same as it reflects down the tube when the tube sides are vertical and parallel. Installation of a collimator, such as a flared out reflective tube, at or near the base of a tube 520 with the diffuser attached to the base may substantially reduce the incident angle of light to the diffuser, which may increase the diffuser optical efficiency and other system performance characteristics.

The daylighting device 500 includes a light collector 510 having a height $h_e$. As used herein, the height $h_e$ may refer to the height of a substantially vertical sidewall portion of the collector 510. For example, the substantially vertical sidewall portion may provide a vertical daylight-collection surface for daylight incident on certain portions of the collector 510. The light collector 510 can be disposed about, or adjacent to, the tube 520, which extends through an opening 529 in a building. The opening 529 has a width $w_o$; the tube 520 has a width $W_t$. The opening of the tube or the opening 529 of the building may provide a target area into which light can be directed by the light collector 510 or otherwise received into the daylighting system 500. In certain embodiments, the height $h_e$ of the light collector 510 is greater than the width $w_o$ of the opening 529, and/or width $w_t$ of the tube/target area. For example, the daylighting installation 500 can include, a light collector 510 configured such that the height of the light collector $h_e$ is approximately 1.2 to 2.5 times greater than the width $W_t$. That is, the height of the light collector $h_e$ has an aspect ratio of approximately 1.1-2.1, or 1.2:1 to 2.1:1 with respect to the width $w_o$ of the opening 529. In certain embodiments, the aspect ratio is greater than 2.5:1. In certain embodiments, the width $w_t$ of the tube 520 is approximately 21 inches, and the width $w_o$ of the opening 529 is greater than, or approximately equal to, the width $w_t$ of the tube 520. In certain embodiments, the light collector 510 has a width $w_e$ of approximately 23 inches, a height $h_e$ of approximately 36 inches, and a collimator 530 terminating in a base having a width of approximately 31 inches.

Figure 6:
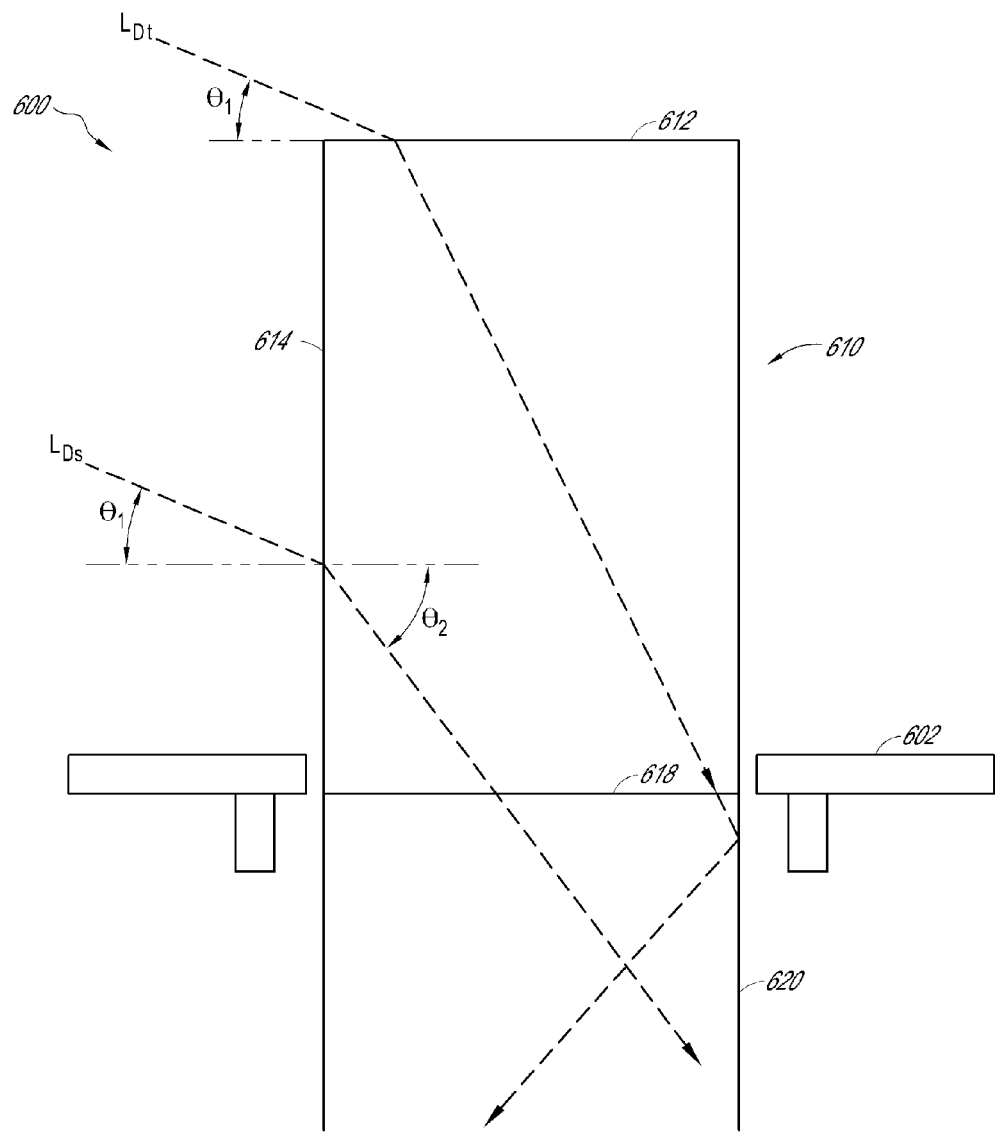
FIG. 6 illustrates an embodiment of the light collector shown in FIG. 1.

FIG. 6 illustrates an embodiment of the light collector 110 shown in FIG. 1. In certain embodiments, the light collector is configured to turn at least a portion of the light $L_D$ striking one of its surfaces such that the light is directed downwardly toward a horizontal aperture of a tube 620. Various features and characteristics of the light collector 610 affect the light turning properties of the collector. As disclosed in U.S. Pat. No. 7,546,709, the entire contents of which are incorporated by reference and made a part of this specification, a transparent cover including a smooth outside surface in combination with an internal prismatic element may produce desirable light-turning effects. In certain embodiments, such a configuration provides a double refraction of the sunlight incident on an outside surface of the collector 610. The collector 610 can be configured to have a continuous curved shape with respect to one or more dimensions, or may have a series of curved and/or flat surfaces.

The light collector 610 illustrated in FIG. 6 includes a top surface 612 and one or more side surfaces 614. The top surface 612 can be substantially flat, as shown, or have a slope substantially near zero. Such a configuration may increase an incident angle of light striking the top portion 612, which may contribute to higher refraction and/or transmission values. In certain embodiments, both the top surface 612 and one or more side surfaces are associated with light turning characteristics. The sidewall portion 614 of the collector 610 may present a vertical daylight-collection surface through which daylight may enter the daylighting device 600. As shown, daylight $L_{Ds}$ may enter the collector 610 through sidewall 614 at a solar altitude $\theta_1$. Light turning characteristics associated with the sidewall 614 may turn light $L_{Ds}$ in a direction towards a target area 618, such as an opening in the tube 620, or other building opening. Turning can be achieved through prismatic characteristics of the collector wall or prismatic element or sheet, or other optical element, in association with the sidewall 614. In certain embodiments, the resultant solar altitude $\theta_2$ of $L_{Ds}$ is greater than that of $\theta_1$. In certain embodiments, an aspect ratio between the height of the collector 610 and the width or diameter of the relevant target area is optimized to improve performance.

Light turning features of the light collector 610 can include prismatic patterns formed on a surface of the collector 610. Such a pattern can be, for example, molded into the inside and/or outside surface of the collector 610. The pattern can be formed by any suitable method, such as by using a casting, or injection molding technique. In certain embodiments, a prismatic element, or other prismatic structure, is adhered to, connected to, or otherwise associated with the collector 610. In certain embodiments, the prisms can be established by horizontal grooves that are defined by opposed faces that may have a flat or curved cross-sectional shape. Furthermore, as disclosed further below, grooves can vary in depth and pitch and/or in other respects. Prisms may circumscribe the entire circumference of the collector 610, and can be substantially uniform throughout the height or circumference, or perimeter, of a portion of the collector 610. In certain embodiments, prisms/grooves vary with respect to one or more parameters at different heights or points along the circumference of the collector 610. For example, prisms can include faces of varying angles, shapes, and/or widths, depending on height and/or position. In certain embodiments, portions of the collector 610 are not associated with prismatic structure.

The top portion 612 of the collector 610 can be associated with light turning characteristics. For example, as shown, light $L_{DT}$ entering the collector 610 through top portion 612 can be turned in a direction towards the tube opening 618, or opening in a building, such that a resulting solar altitude of the light $L_{DT}$ has a solar altitude of $\theta_3$. In certain embodiments including optical turning elements associated with both stet top portion 612 and stet sidewall portion 614, $\theta_3$ is greater than $\theta_2$. That is, light $L_{DT}$ striking the top portion 612 can be turned to a greater degree that light $L_{DS}$ striking the side portion 614. In certain embodiments, the top portion 612 does not include prismatic structure or light-turning characteristics. For example, the top portion can include a clear acrylic surface that is substantially optically transparent. In certain embodiments, the top portion is at least partially optically opaque, or reflective. Such qualities can be desirable in order to reduce the amount of light transferred through the collector 610 into the tube 620 at various points during the day, such as during the middle of the day when sunlight levels are relatively intense.

The tube 620 can be a separate component of the daylighting device 600 than the light collector 610. For example, the tube can be an internally reflective channel of rigid construction, such as having a construction of aluminum and/or other material that is disposed adjacent to, or connected to, the light collector 610. In certain embodiments, the tube 620 and the collector 610 are integrated such that the two components substantially combined into a single structure.

Figure 7:
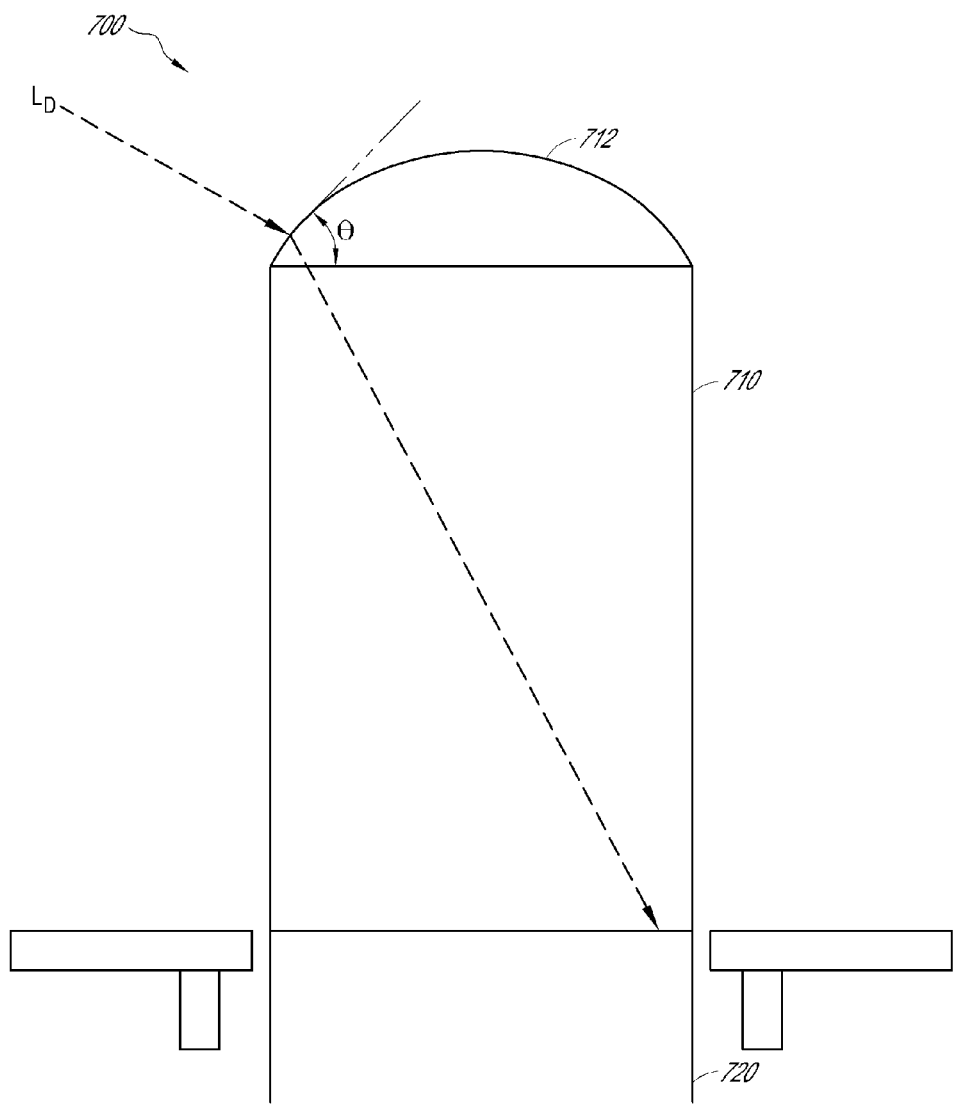
FIG. 7 illustrates an embodiment of a daylighting device including a light collector with a dome-shaped top portion.

FIG. 7 illustrates an embodiment of a daylighting system 700 including a light collector with a dome-shaped top portion 712. The dome-shaped top portion 712 may present a surface that is angled ($\theta$) at various points with respect to a horizontal plane. Such an angle $\theta$ may affect the refractive characteristics of the top portion 712, and may vary along the surface of the top portion 712.

Figure 8:
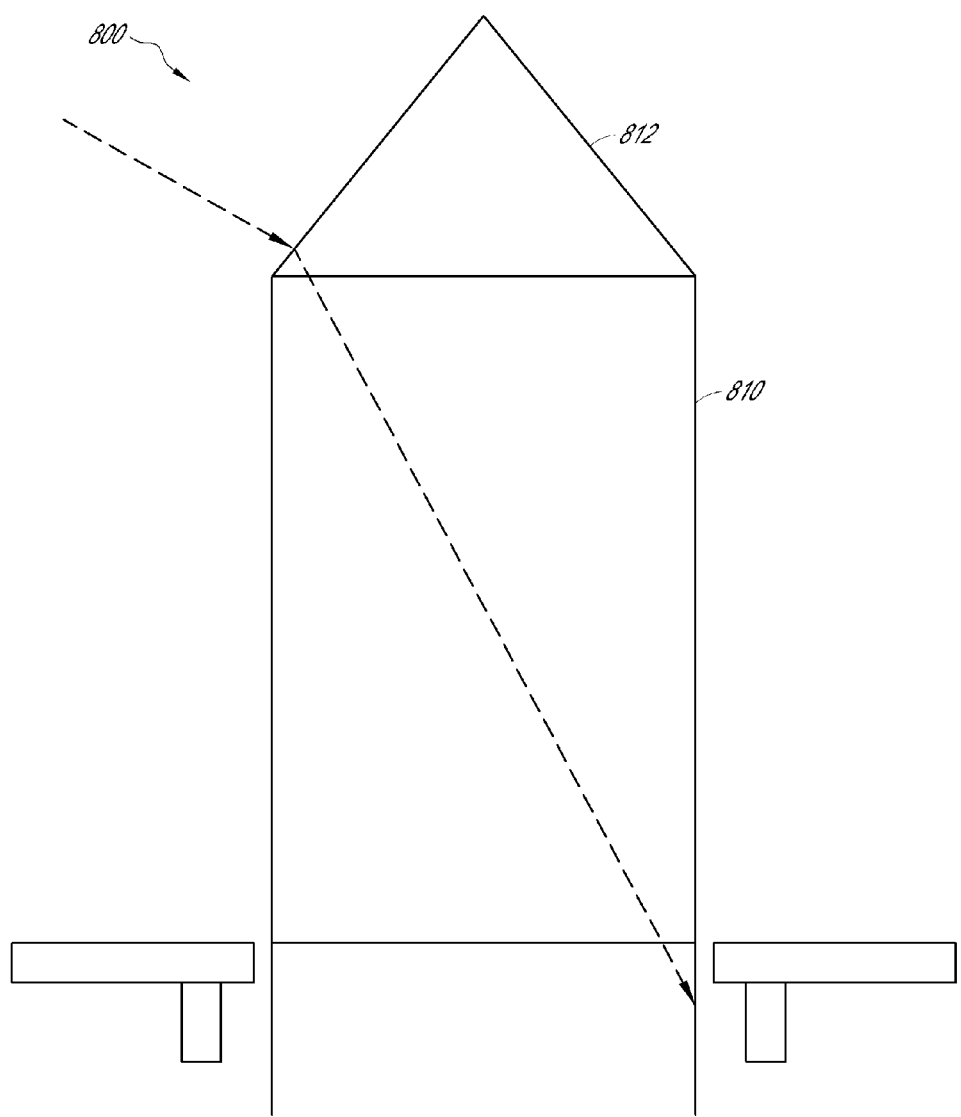
FIG. 8 illustrates an embodiment of a daylighting device with a top portion having a triangular cross-section.
Figure 9A:
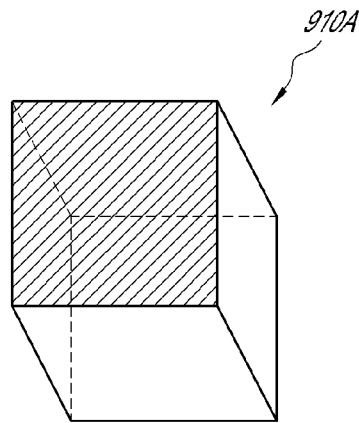
FIGS. 9A-9F illustrate embodiments of light collectors having various cross-sectional shapes.
Figure 9B:
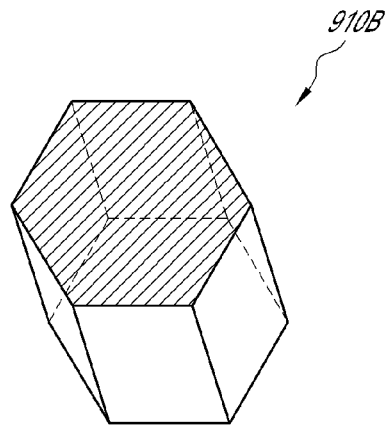
Figure 9C:
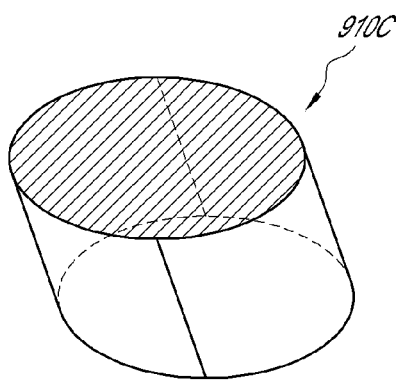
Figure 9D:
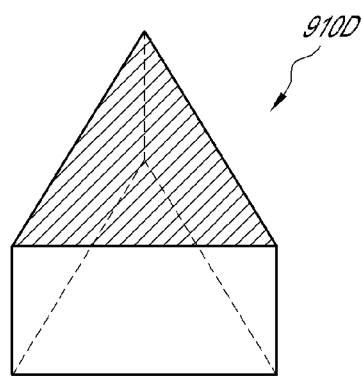
Figure 9E:
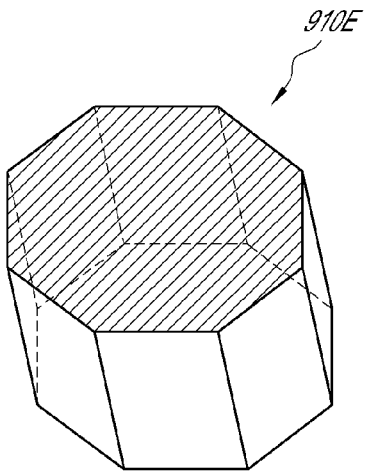
Figure 9F:
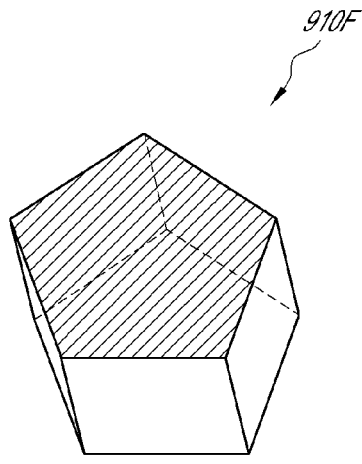

The top portion 712 can include any suitable shape. For example, FIG. 8 illustrates an embodiment of a daylighting system 800 with a top portion 812 having a triangular cross-section. The cross-section of FIG. 8 may, for example, correspond to a light collector having a top portion 812 that is conical or pyramidal in shape. The shape, and/or size of the light collector 810 and/or top portion 812 may depend on various system considerations, such as ease of manufacturing/installation, refractive characteristics, aesthetics, and or other considerations. Any suitable shape or size of the top portion (e.g., 712, 812) can be used in daylighting devices constructed or configured according to one or more embodiments disclosed herein.

Though generally illustrated herein as having a cylindrical, or oval-shaped cross-section in certain embodiments, a light collector in accordance with the present disclosure may have any suitable cross-sectional shape. Furthermore, the cross-sectional shape of a light collector may vary at different points along a vertical axis of the light collector. FIGS. 9A-9F illustrate embodiments of light collectors having various cross-sectional shapes. The various shapes shown in FIGS. 9A-9F include square or rectangular 910A, hexagonal 910B, elliptical or oval-shaped 910C, triangular 910D, octagonal 910E, and pentagonal 910F light collectors. However, the embodiments depicted are provided as examples only, and a light collector for use in a daylighting system as described herein can be any suitable or feasible shape and/or size. Variously shaped light collectors can be configured to correspond to a shape of a building opening through which a daylighting device transmits light.

Figure 10:
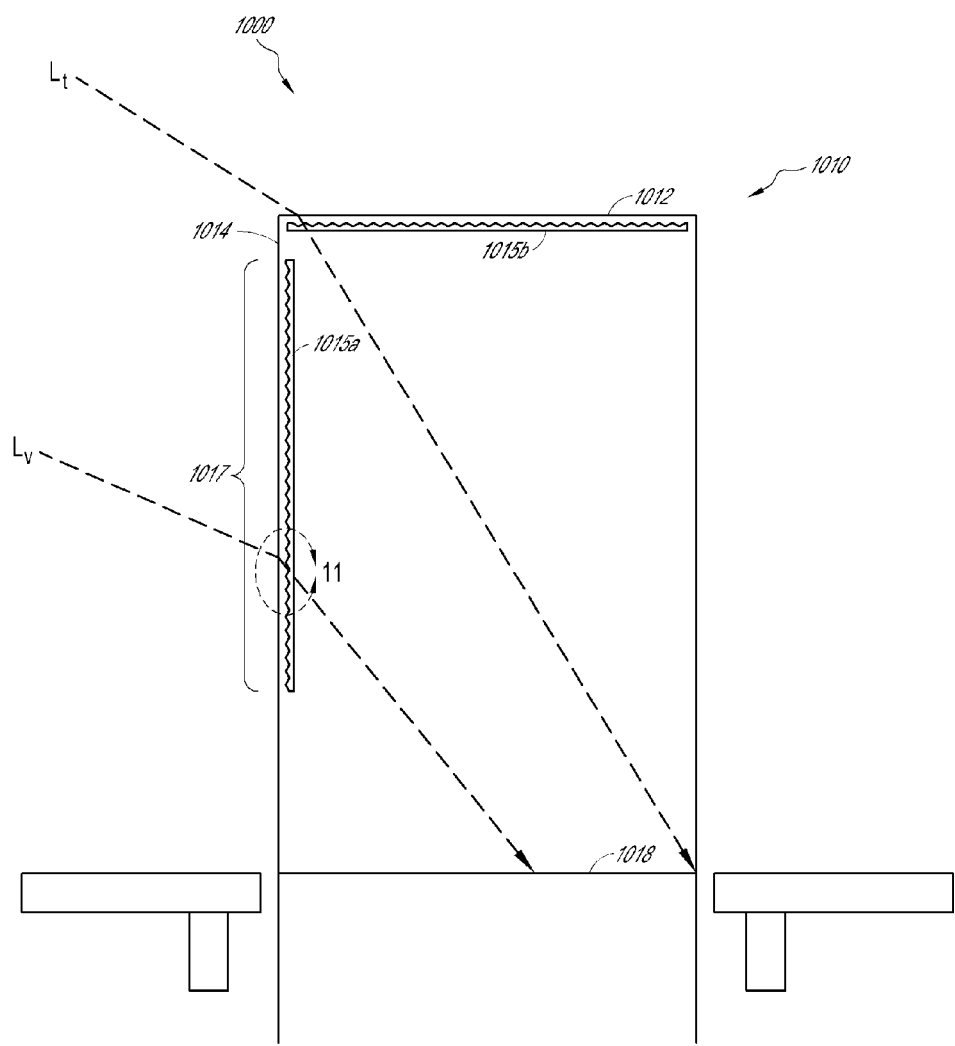
FIG. 10 illustrates a cross-sectional view of a light collector including both a side portion, and a top portion.

FIG. 10 shows a cross-sectional view of a light collector 1010 including both a side portion 1014, and a top portion 1012. The collector 1010 can include a transparent acrylic material, or other material that is at least partially transparent. In certain embodiments, the collector 1010 can be manufactured at least partially of transparent acrylic having a thickness of approximately 100-125 mm. In certain embodiments, a prismatic element is disposed within or without the side portion 1014, which may provide double refraction of light. For example, as illustrated in FIG. 10, the prismatic element 1015a can include prisms facing outward to provide a first refraction of light and a planar surface of the sheet providing a second refraction. In certain embodiments, this prismatic pattern is molded into a thin polymer sheet that can be placed inside a protective transparent collector structure. The top portion 1012 can include a variable prism dome. Alternatively, or in addition to, the incorporation of the prismatic element 1015, one or more walls or surfaces of the collector 1010 can include prismatic features formed therein. While such formed prismatic features can be used, in certain embodiments, a prismatic element may provide desirable light turning characteristics relatively more efficiently, with respect to cost, ease of manufacture, and/or other considerations.

In certain embodiments, the side portion 1014 is cylindrically shaped, providing a 360-degree sunlight capture zone. The effective light capture area of the side portion 1014 can be an area of a cylinder in direct exposure to rays of sunlight, as well as a portion of the top cover 1012 that is directly exposed to the sunlight. In certain embodiments, in the presence of unobstructed, substantially collimated light, the effective capture area of the side portion 1014 can be approximately 90 degrees of the 360 degree circumference of the side portion 1014, or approximately 25% of the total surface area of the side portion 1014.

In certain embodiments, the prismatic element 1015a, with either outwardly-facing or inwardly-facing prisms, extends along the inside of at least a portion 1017 of the side portion 1014 of the collector 1010. In certain embodiments, sunlight may refract down into the tube if the sunlight is within approximately +/−45 degrees incident angle to the surface of the side portion 1014 of the collector. The side portion 1014 can be hollow, and may extend from the top portion 1012 down, terminating in an open lower end 1018, through which light can pass.

In certain embodiments, the light collector 1012 can be configured such that optical elements associated with the side portion 1014 capture sunlight having elevations ranging from 20°-40°, while optical elements associated with the top portion 1012 capture incident light at solar elevations greater than approximately 45°. By capturing sunlight incident at a wide range of solar altitudes, the optical elements of the light collector 1012 can substantially enhance the light collection performance of the daylighting device 1000 over a wide range of latitudes and seasons. As shown in FIG. 10, the light collector 1010 can include one or more prismatic elements 1015a, which extend across at least a segment 1017 of a perimeter of the side portion 1014. The prismatic element 1015a can be a single unitary member, or can include multiple distinct segments. In certain embodiments that include a prismatic element 1015a, the prismatic element 1015a can span the entire side portion 114 of the light collector 1010. Alternatively, as shown in FIG. 10, the prismatic element 1015a can span a segment 1017 of the perimeter of the side portion 1014, but not span a remaining perimeter segment that is contiguous to the spanned segment 1017.

In certain embodiments, a prismatic element 1015a can include prisms configured to refract light. Prisms can include prism grooves on an outer surface of the prismatic element, and can be linear when the sheet is in a flat configuration and, thus, form circles when the sheet 1015a is formed into a cylindrical configuration. The outer surface of the prismatic element can be positioned against, or proximate to, an inner surface of the side portion of the collector. The prism grooves can be outwardly facing, as shown in FIG. 10, or otherwise configured. In certain embodiments, similar prisms are present in both the top portion and the side portion, both serving to increase light throughput. The various prism elements included in the light collector 1010 can have different prism angles, depending on what portion of the collector 1010 they are associated with. In certain embodiments, the prism elements in the light collector 1010 have uniform prism angles throughout the collector 1010. In certain embodiments, prisms within a single region of the collector 1010 have varying prism angles. For example, it can be desirable for adjacent prisms, or adjacent groups of prisms, to include different prism angles in order to mix the light that propagates through a portion of the light collector 1010. For example, if substantially collimated light enters a prismatic portion of a light collecting assembly that includes prisms with equal prism angles, light entering the tube can be concentrated in certain regions. Such light concentration may cause undesirable "hot spots" in the destination area. By varying the prism angles, the effect of such hot spots can be reduced.

The top portion 1012 can be made integrally with the side portion 1014 and may extend from an open base 1018 to a closed top portion 1012, forming a continuous wall. Alternatively, the top portion 1012 can be an at least partially separate physical component from the side portion 1014. In the depicted embodiment, the top portion 1012 is substantially flat, and can be associated with one or more optical components, such as a prismatic element 1015b. However, as discussed above, the top portion 1012, or any other portion of the light collector 1010, can be shaped in any suitable manner.

In certain embodiments, the top portion 1012 is at least partially constructed of transparent acrylic. The top portion 1012 can be formed with prismatic elements, which can be prism lines that are etched in, molded in, or otherwise integrated with or attached to the top portion 1012. In certain embodiments, the prism elements increase light throughput by capturing light originating outside the collector 110 and turning it downward through the open base portion 1018, and into a tube assembly. Prismatic elements associated with the top portion 1012 may differ from those associated with the side portion 1014. For example, the prismatic element 1015b can include prismatic grooves having opposing faces that lie at angles of approximately 45° and 18°, respectively, with respect to a vertical plane. Prisms including faces that lie at other angles are also contemplated with respect to embodiments of top, side, and/or other portions of light collecting assemblies disclosed herein.

Figure 11:
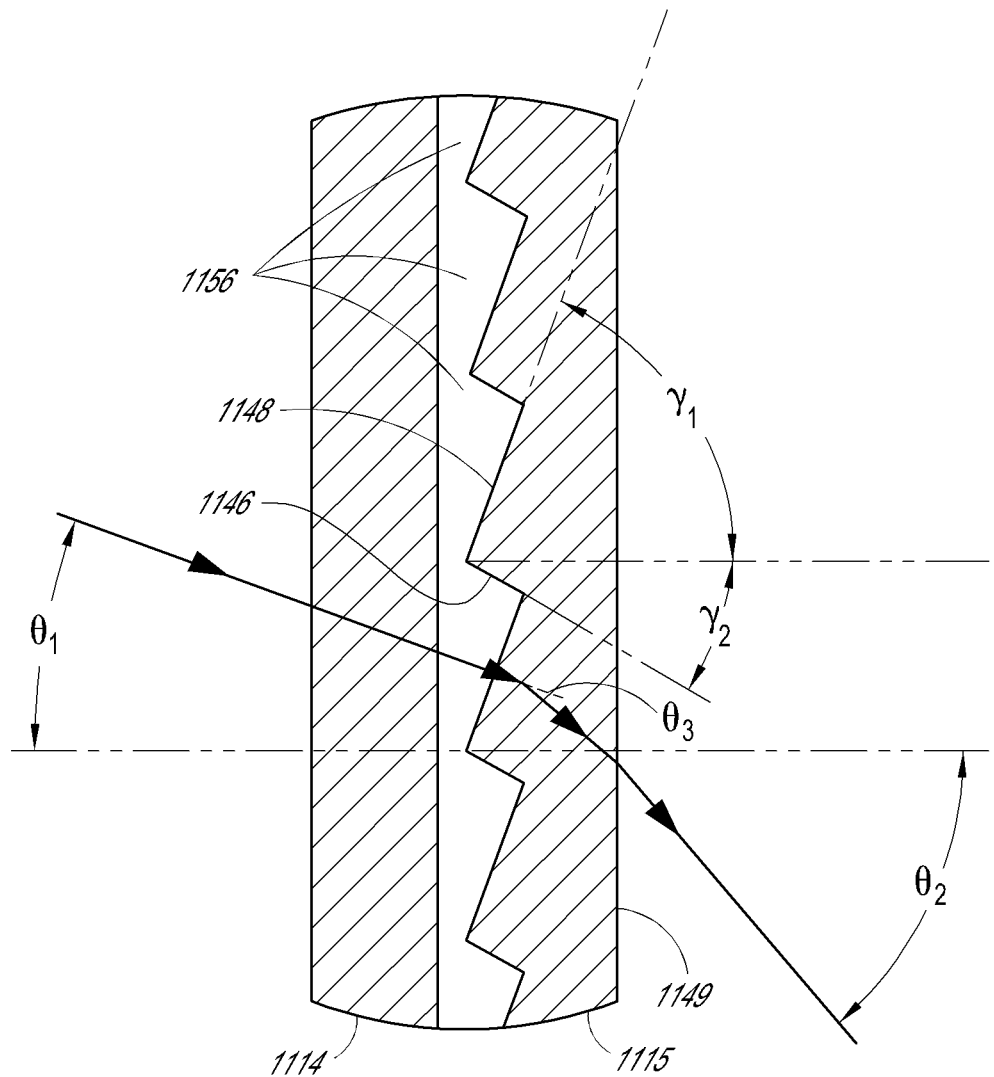
FIG. 11 illustrates a cross-sectional view of a portion of the prismatic element shown in FIG. 10.

FIG. 11 provides a cross-sectional view of a portion of the prismatic element 1015a shown in FIG. 10. The portion of the prismatic element 1015a shown in FIG. 11 includes a plurality of prisms 1156. The structure shown in FIG. 11 includes an outer transparent side portion 1114 of the light-collecting assembly 1010 of FIG. 10. The prisms 1156 can be positioned along the interior surface of the side portion 1114, and may face the direction of sunlight $L_S$ penetrating the side portion 1114. In certain embodiments, prisms 1156 are inwardly facing, with back surface 1149 of the prisms facing the side portion 1114. In certain embodiments, prismatic element 1115 contains prisms on more than one of its sides. The prisms can be configured to turn at least a portion of sunlight that strikes the cylinder portion of the light collecting assembly downward towards a horizontal aperture of a tube.

In certain embodiments, prisms 1156 include two faces 1146, 1148. In the embodiment of FIG. 11, face 1148 has a prism angle $\gamma_1$ with respect to horizontal, while face 1146 has a prism angle $\gamma_2$ below horizontal. The prism angles $\gamma_1$ and $\gamma_2$ can be equal, or may vary, depending on the configuration of the prismatic element 1115. Furthermore, adjacent prisms 1156, or groups of prisms, may have varying prism angles. Such varying prism angles may promote mixing of light propagating through a light collector. In certain embodiments the prismatic element 1115 includes prisms having uniform prism angles. In certain embodiments, the prism angles $\gamma_1$ and $\gamma_2$ have angles of approximately 70° and 30°, respectively.

With further reference to FIG. 10, prism angles associated with the top portion 1012 and the side portion 1014 can be selected to provide an angle of refraction that increases the range of solar altitudes at which radiation that can be captured and turned towards the daylighting aperture 1018 at the base of the light collector 1010. In certain embodiments, the light collector 1010 and prismatic element are made of the same material or materials, or materials having substantially similar indexes of refraction. In some embodiments, the prismatic element(s) can include a material or materials with higher index of refraction than a sidewall of the light collector.

The top portion 1012 can be configured to reduce the effective capture area of the light collector 1010 at solar altitudes higher than a certain value to prevent over illumination and/or heating during midday hours (such as, for example, between 10 am and 3 pm, between 11 am and 2 pm, or during a time when the solar altitude is greater than or equal to about 30 degrees). In certain embodiments, at least a portion of the top portion 1012 can be configured to reflect some or all of the light striking such portion at solar altitudes above a certain angle. For example, at least some of the top portion 1012 can be configured to reflect at least a portion of overhead sunlight in order to reduce light and/or heat during midday hours. Embodiments of the light collector 1010 with a prismatic element 1015b positioned to receive daylight transmitted through the top portion 1012 can be beneficial in sunny and high solar altitude conditions. A prismatic element 1015b in the top portion 1012 can direct a substantial portion, most, or substantially all daylight incident on the top portion 1012 towards a reflector, such as, for example, the reflector 1980 shown in FIG. 19. The reflector can be configured to reject wavelengths of daylight that transmit thermal energy but provide little or no visible illumination.

In certain embodiments, the top portion 1012 of the light collector 1010 can be constructed at least partially from clear acrylic, transparent plastic, another suitable material, or a combination of materials. Embodiments of the light collector 1010 with a clear top portion can be beneficial in diffuse daylight conditions due to relatively high transmission of overhead sunlight.

The walls of the side portion 1014 can be substantially vertical, or may have any desirable inward or outward slope. In certain embodiments, the walls of side portion 1014 are sloped to allow for nesting of multiple such components to allow for tighter packaging.

In certain embodiments, the side portion 1014 provides a substantially vertical daylight-collection surface for sunlight collection, which may provide higher aspect ratios for light collection. Prismatic elements can be integrated with at least a portion of the wall of the side portion 1014. In alternative to, or in addition to, prisms integrated in the side portion 1014, the above-described prismatic element can be used to refract light downward. The planar back side 1149 of the prismatic element 1115, shown in FIG. 11, may provide good downward refraction due to a high to low index of refraction interface. Certain light collector embodiments include a plastic polymer with an index of refraction in the range of approximately 1.49-1.65.

Figure 12:
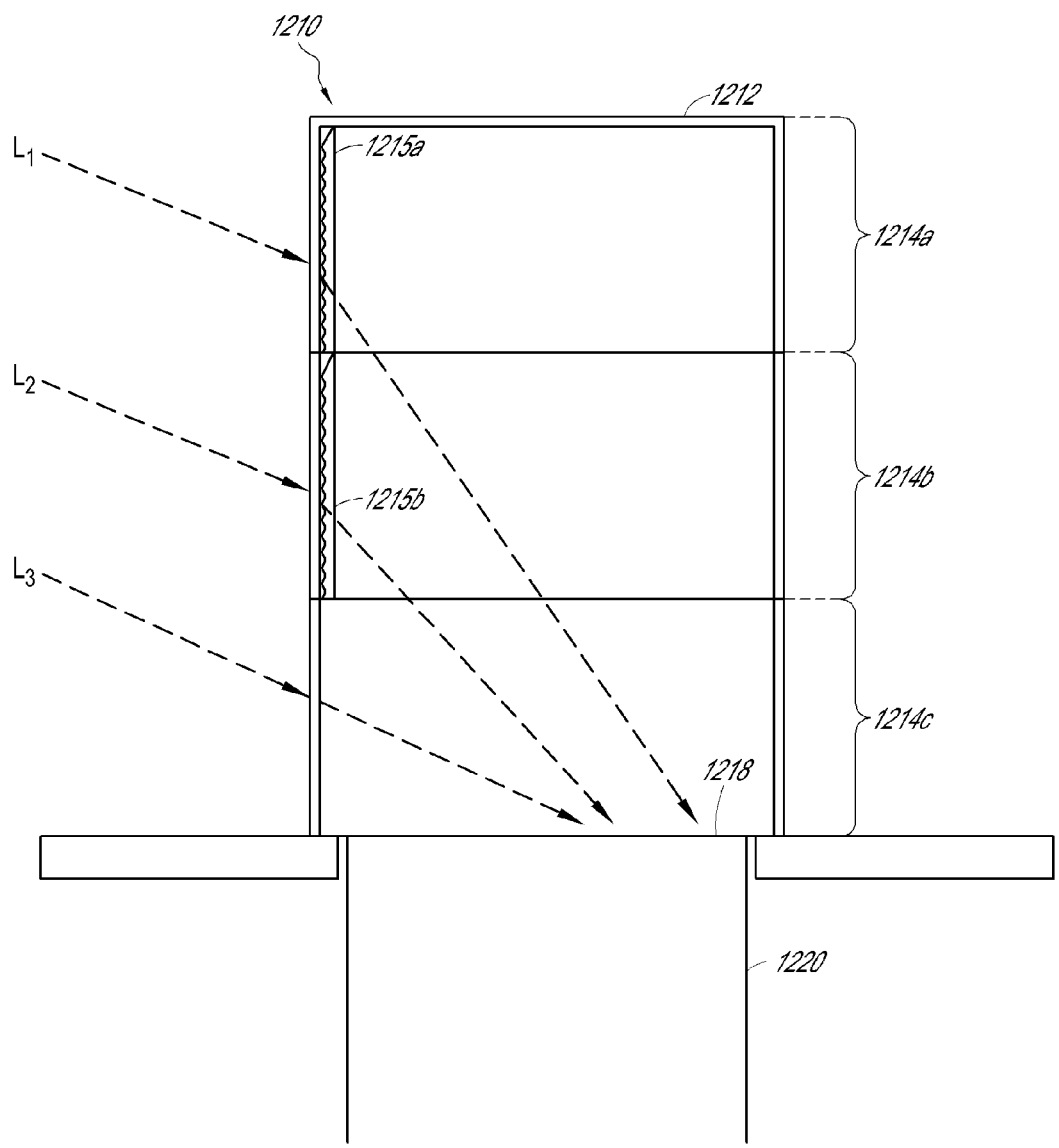
FIG. 12 illustrates a cross-sectional view of a light collector including a side portion that includes a plurality of vertically arranged optical zones.

FIG. 12 shows a cross-sectional view of a light collector 1210 including a side portion that includes a plurality of vertically arranged optical zones, or segments 1214a, 1214b, and 1214c. In certain embodiments, various segments are associated with prismatic elements having different prism angles or characteristics. For example, a top segment, such as segment 1214a, can be associated with light turning structure 1213a configured to turn light at a relatively high angle towards the base 1218 of the light collector 1210. This can be desirable in order to increase the percentage of light $L_1$ entering the top segment 1214a that is directed through the base 1218 of the light collector 1210 and into a tube 1220. As light entering the top segment 1214a has a relatively farther distance to travel in order to reach the base 1218, it can be necessary or desirable to turn such light to a relatively high angle. Relative to the prismatic structure 1215a, the prismatic structure 1215b that is associated with the second segment 1214b can include prismatic angles that turn light $L_2$ to a lesser degree than $L_1$ is turned. This can be desirable due to the prismatic structure 1215b being disposed generally closer to the base 1218. Therefore, it may not be necessary to turn light $L_2$ as much to facilitate the propagation of light entering the light collector 1210 through the second segment 1214b to a desirable degree.

The light collector can include one or more portions or segments, such as segment 1214c, that are not associated with prismatic structures. For example, a segment, such as segment 1214c, disposed relatively near to the base 1218 may require relatively less turning of light, or no turning of light to achieve desirable levels of light collection. Therefore, as shown, light L3 entering the bottom segment 1214c may enter the tube 1220 substantially without being refracted toward the tube by the light collector 1210.

Although the light collector illustrates three segments, a light collector in accordance with certain embodiments disclosed herein may contain any number of segments or regions. Furthermore, different segments can be associated with optical elements having varying characteristics, or can be uniform through one or more segments.

As shown in FIG. 12, the width $w_c$ of the collector base 1218 can be greater than the width $w_d$ of the tube 1220 at a horizontal aperture. For example, the diameter of the collector base 1218 may range from 100% to 150% or more of the width of the tube 1220.

Figure 14A:
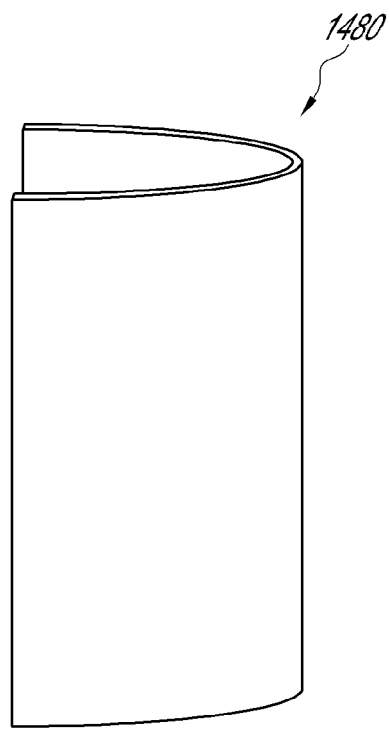
FIG. 14A illustrates a perspective view of an embodiment of a light reflector for disposing within, adjacent to, or in integration with, a light collecting assembly.

In certain embodiments, a flat or curved reflective panel is associated with a light collector that reflects at least a portion of sunlight that would otherwise exit the light collector through a portion generally opposite to a region of the light collector through which daylight is received. FIG. 14A provides a perspective view of an embodiment of a light reflector 1480 for disposing within, adjacent to, or in integration with, a light collecting assembly. The reflector can be made of material having high luminous reflectance. For example, the luminous reflectance of the reflector 1480 can be greater than or equal to about 0.9, greater than or equal to about 0.95, greater than or equal to about 0.98, or greater than or equal to about 0.99, when measured with respect to CIE Illuminant $D_{65}$. The reflector 1480 can be curved, as shown, or can be any shape configurable to reflect light propagating within or near a light collecting assembly.

Figure 14C:
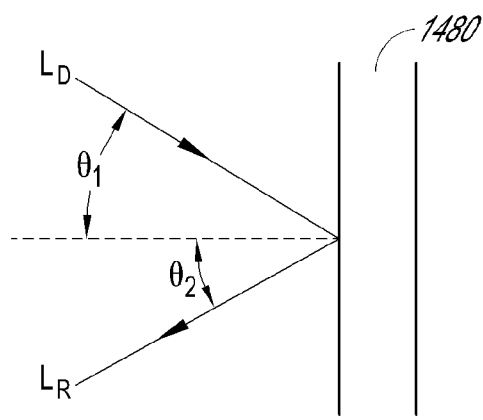
FIG. 14C illustrates a cross-sectional view of a vertically-oriented planar reflector.
Figure 14B:
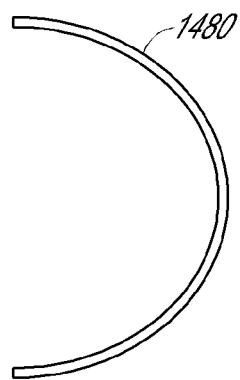
FIG. 14B, illustrates a top view of an embodiment of the reflector shown in FIG. 14A

As is shown in FIG. 14B, which provides a top view of the reflector 1480 of FIG. 14A, the reflector 1480 can be semi-circular in shape, such that it can be nested within a cylindrically-shaped light collector. The reflector 1480 may conform to the shape of a back portion of a light collecting assembly, and can be disposed behind a refractive lens, thereby increasing the effecting light capture area of the light collector. The reflector 1480 may provide increased transmission of captured sunlight into an optical guide tube.

The use of a curved reflector 1280 may allow for sunlight capture from a greater range of circumferential angles about the light collector 1220. This increase in angular reflection of sunlight may provide a number of benefits, such as increased light mixing. For example, in embodiments in which sunlight enter a tube opening from a wide range of circumferential angles, the distribution of light exiting the tube can be more uniform and may reduce the presence of hot spots on a diffuser at the base of the tube. Such light mixing can prevent collimated light from reaching the diffuser prisms in such a way as to cause rainbows to appear in the building interior.

With respect to certain embodiments in which light is directed into a central feeder tube, and dispersed into multiple branch tubes, light mixing can be important in promoting the dispersion of sunlight into the various branch tubes. In certain embodiments, branch tubes each receive approximately equal amounts of light from the central feeder tube.

The collection and redirection of sunlight using a light reflector, such as the curved reflector 1480, may substantially increase the performance of a conventional tubular daylighting device. A number of parameters may contribute to increased performance of certain embodiments of sunlight-collection systems. For example, the sunlight collection area of a light collector may affect the performance of such a system. In certain embodiments, the height and width of the collector in relation to the diameter of a tube opening into which light is directed can be determined by the refractive turning power of optical elements (e.g., integrated prisms, prismatic element or lens film, etc.) within, or associated with, the light collector. This aspect ratio of cylinder height to tube opening width, or diameter, may depend on the solar altitude range that is desired to capture and refract into the tube. This range can be from approximately 20 to 70 degrees for most locations in the United States. For example, using lower-end solar altitude of approximately 20 degrees as the design point for refracting light into the tube from the optical elements associated with a light collector having vertical side walls, the cylinder height can be designed to an approximate range of 1.2 to 2.5 times the tube diameter. These values may vary based on material index of refraction and prism angles, among other things. As an example, a system can include a collector height of approximately 35-45 inches and a tube diameter of approximately 20-25 inches. The diameter of the collector can be approximately equal to the diameter of the tube opening, or can be larger or smaller than the diameter of the tube. The actual effective front light-capture area of the cylinder is associated with the direct non-reflected sun, which, in certain embodiments, can be limited to an exposure angle of approximately 90 degrees due to the off axis curvature limitation of the optics in the collector prisms.

FIG. 14C provides a cross-sectional view of the vertically-oriented planar reflector 1480. As is shown in the figure, the angle $\theta_1$ of direct light $L_D$ with respect to a horizontal plane is generally equal to the angle $\theta_2$ of reflected light $L_R$. In certain embodiments, it can be desirable for the reflector surface to be tilted with respect to a vertical axis to increase the reflected angle $\theta_2$ with respect to horizontal. Furthermore, in certain embodiments, the reflector 1480 is associated with one or more prismatic surfaces that further increase the angle of reflected light. Such prisms may vary over different portions of the reflector in order to increase the amount of light received into a tube opening.

Figure 15:
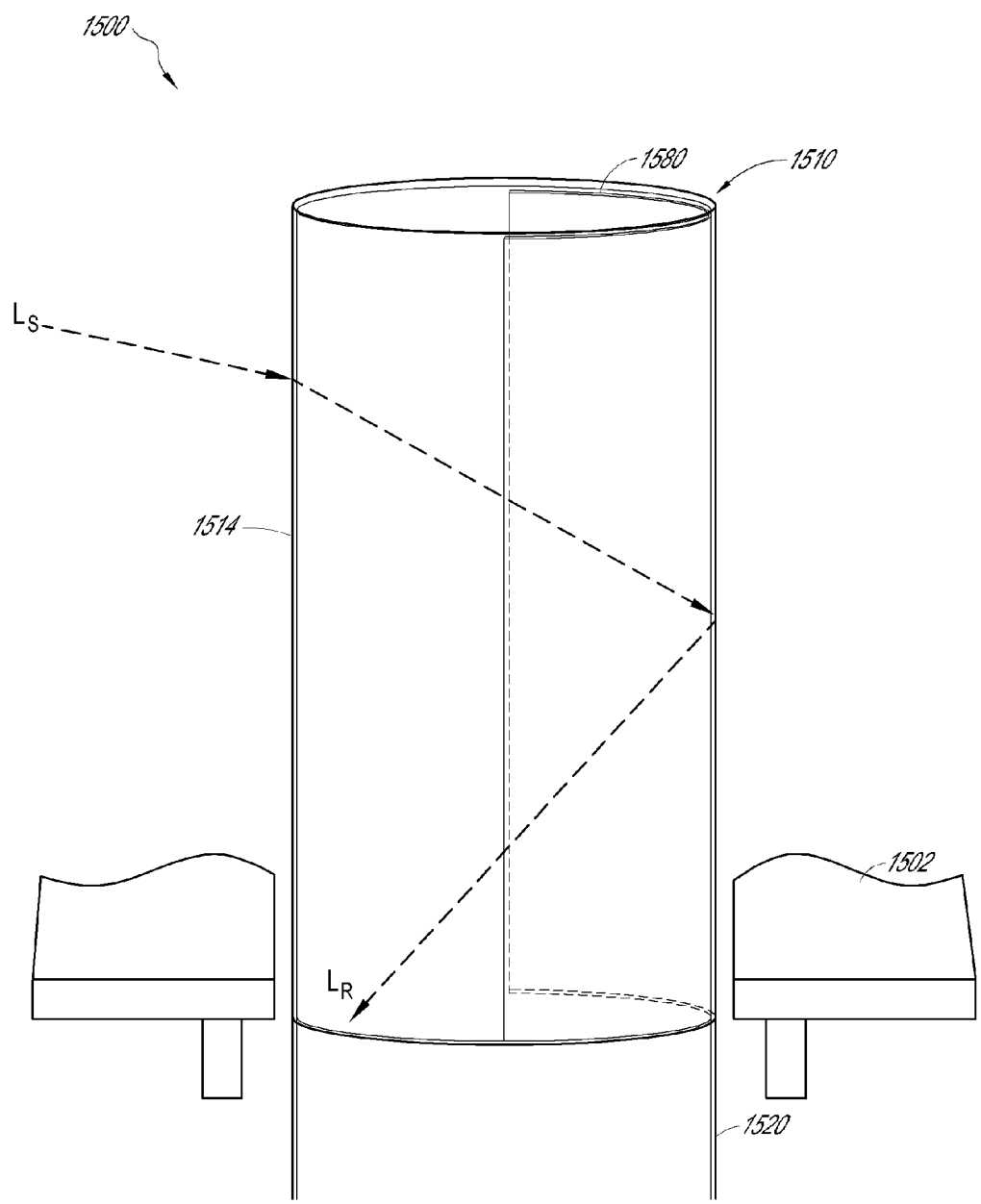
FIG. 15 illustrates a perspective view of an embodiment of daylighting device including a light collector incorporating a reflector.

FIG. 15 illustrates a perspective view of an embodiment of daylighting device 1500 including a light collector 1510 incorporating a reflector 1580. The daylighting device 1500 includes a light-reflecting tube 1520 disposed adjacent to the light collector 1510. As shown, daylight $L_S$ enters the light collector 1510 through a side portion 1514. The light $L_s$ is refracted by one or more optical elements associated with the side portion 1514 and turned towards an opening in the tube 1520. In certain embodiments, the side portion 1514 is not associated with light turning characteristics, and light $L_S$ entering the light collector 1510 propagates within the light collector at an angle substantially equal to the angle of the light $L_S$ prior to entering the light collector 1510. The presence of the reflector 1580 may increase the effective area of collection of one or more refractive lenses associated with the light collector and configured to turn light towards the tube 1520.

The reflector 1580 is disposed along an inside or outside surface of the light collector 1510, such as along a surface that is positioned substantially opposite to a direction at which light $L_S$ may enter the light collector 1510 at one or more points during the day. For example, the reflector 1580 may generally face in a southern direction in an embodiment located at a point in the northern hemisphere. As shown, daylight $L_S$ may enter the light collector 1510 and strike a point on the reflector 1580. The reflector may reflect at least a portion of the daylight in the visible spectrum towards the tube opening 1528. If not for the reflector, a substantial portions of the light $L_R$ may instead propagate out of the tube or be absorbed by materials associated with the light collector 1510. Therefore, inclusion of a reflector 1580 in a daylighting system 1500 may increase the amount of light transmitted through the light collector 1510 into the tube 1520.

Figure 16:
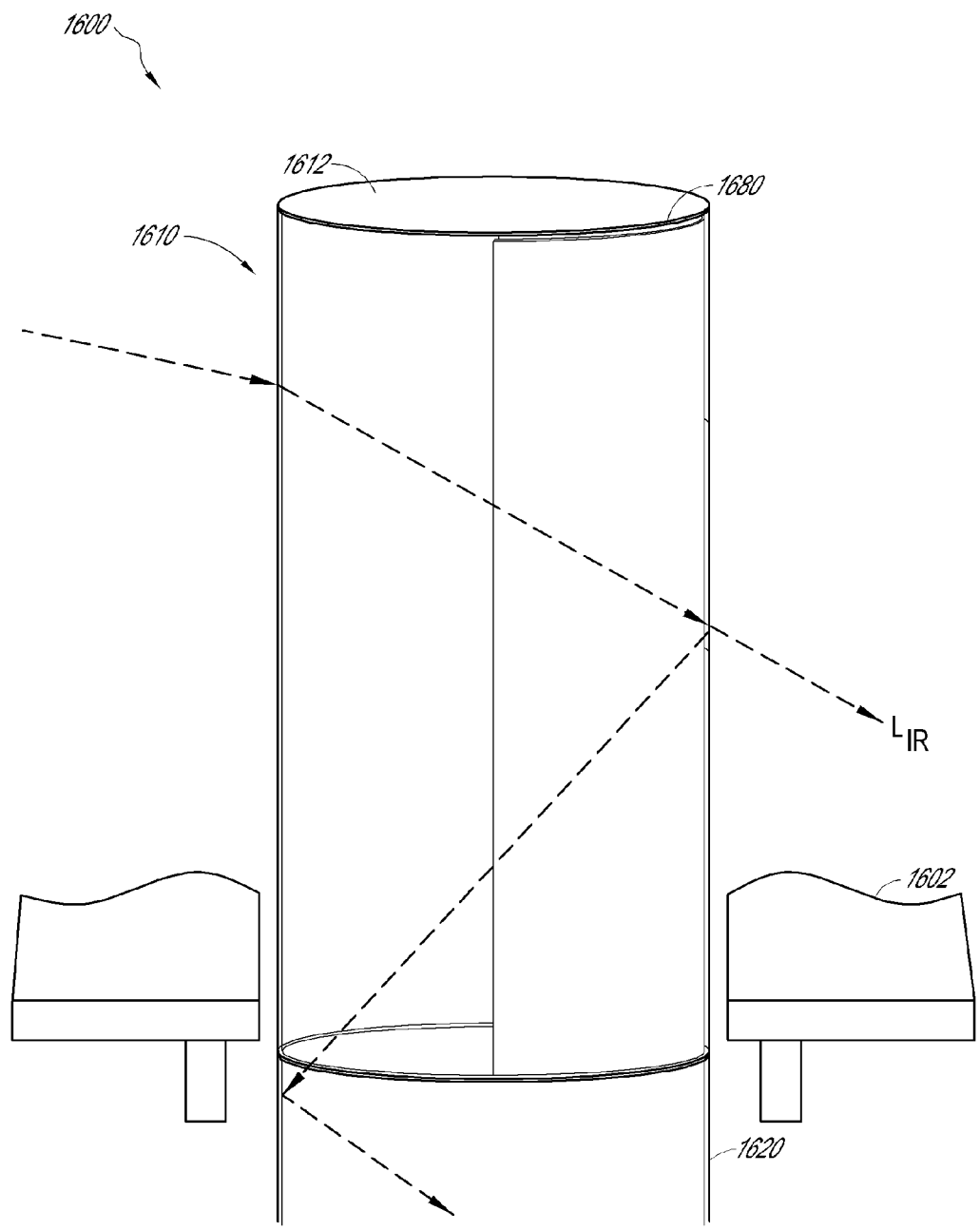
FIG. 16 illustrates a perspective view of an embodiment of daylighting device including a light collector incorporating a reflector.

FIG. 16 illustrates a perspective view of an embodiment of daylighting system 1600 including a light collector 1610 incorporating a reflector 1680. The reflector 1680 can include characteristics allowing for pass-through transmission of certain amounts of light of certain wavelengths. For example, in certain embodiments, the reflector 1680 is at least partially transparent with respect to light in the infrared spectrum. Sunlight includes infrared light and visible light. In general, infrared light transfers thermal energy but provides little or no advantage when the goal is illumination. A daylighting device that directs infrared light into a building can substantially increase temperatures within the building without providing any measurable illumination benefit. In some embodiments, a light collector includes a reflector that allows at least a portion of infrared light that is incident on its surface to pass through the reflector and out of the light collector 1610, rather than reflecting such light in the direction of the tube 1620. In certain embodiments, a light collector 1610 is configured to capture and remove at least a portion of infrared light incident on the collector and/or other spectral wavelengths that do not contribute to visible illumination. In such embodiments, the light collector 1610 can simultaneously turn a substantial portion of visible light, such as, for example, greater than or equal to 95%, greater than or equal to 98%, or greater than or equal to 99% of visible light, towards a daylighting aperture formed in the base of the collector 1610.

The dashed line in FIG. 16 shows a possible path of sunlight that is captured by the light collector 1610. When incident on an outside surface of the collector 1610, the sunlight includes visible and infrared light. At least a portion of the light incident on the surface of the at least partially transparent light collector 1610 passes into the interior of the light collector 1610. The light propagates within the light collector 1610 until it strikes a reflector 1680 positioned to receive at least a portion of the light entering the light collector 1610. In certain embodiments, the reflector 1680 is disposed along an inner or outer surface of a substantially vertical sidewall the light collector 1610. In some embodiments, the light transmits through a second transparent sidewall of the light collector before propagating to a surface of the reflector 1680. The reflector 1680 is configured to turn at least a portion of the light in a direction generally towards an opening of a tube 1620 positioned to receive light that exits the daylight collector 1610 through a daylighting aperture in the base of the collector. In some embodiments, the reflector 1680 is at least partially transparent to infrared light $L_{IR}$. In such embodiments, a portion of the infrared light $L_{IR}$ transmits through the reflector 1680 and exits the light collector 1610, propagating away from the opening of the tube 1620.

In certain embodiments, the reflector 1680 is configured to transmit wavelengths other than infrared. For example, the reflector 1680 can partially reflect and partially transmit visible light. As another example, the reflector 1680 can reflect most or substantially all visible light while transmitting and/or absorbing at least a portion of ultraviolet light.

Figure 17A:
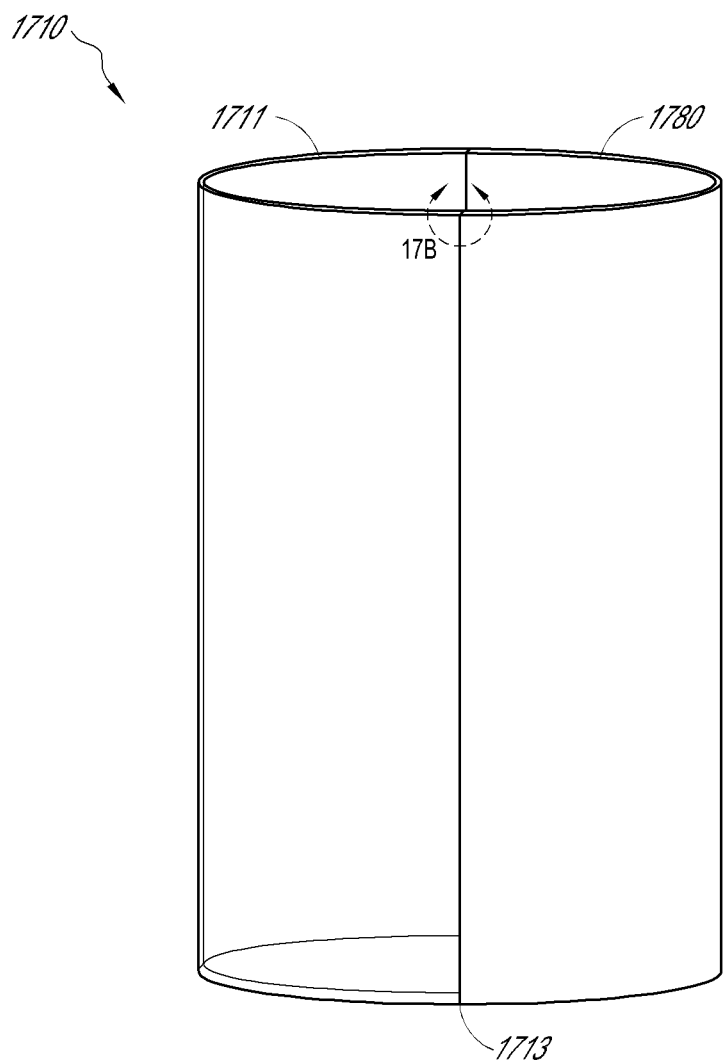
FIG. 17A illustrates an embodiment of a light collector having a transparent portion and a reflector assembly.

FIG. 17A illustrates an embodiment of a light collector 1710 having a transparent assembly and a reflective assembly. The light collector 1710 includes a transparent assembly 1711 that is at least partially transparent to daylight incident on its surface. For example, the transparent assembly 1711 can include a sheet of substantially clear acrylic in a semi-circular, curved, planar, and/or segmented configuration. The reflective assembly 1780 can include material for reflecting at least a portion of light incident on one or more of its surfaces. For example, the reflective assembly 1780 can be a semi-circular, curved, planar, and/or segmented reflector. In certain embodiments, the reflective assembly 1780 includes aluminum, reflective film, a metallic reflector, other reflective materials, other optical elements, or a combination of optical elements.

Figure 17B:
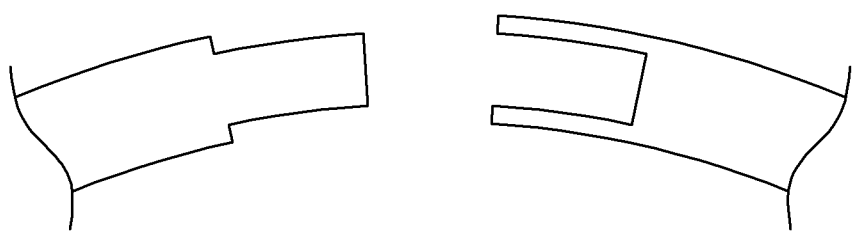
FIG. 17B illustrates a top view of an embodiment of a connecting structure of a light collector.

The transparent portion 1711 and the reflector assembly 1780 can be connected at a seam 1730 to form a combined structure, such as an enclosed cylinder or other shape. The structures can be combined in any suitable manner. For example, the structures can be adhered together through the use of an adhesive substance, or by welding or other technique. In certain embodiments, the structures 1711, 1780 are connected using one or more physical connection structures, such as clips, slots, staples, and the like. For example, as shown in FIG. 17B, which provides a top view of a portion of the light collector 1710, one or more end portions of the respective structures can include male/female slot connecting members for connecting two or more structures. Such a configuration may allow for connection of structures without the need of additional separate connecting devices or materials.

Figure 18:
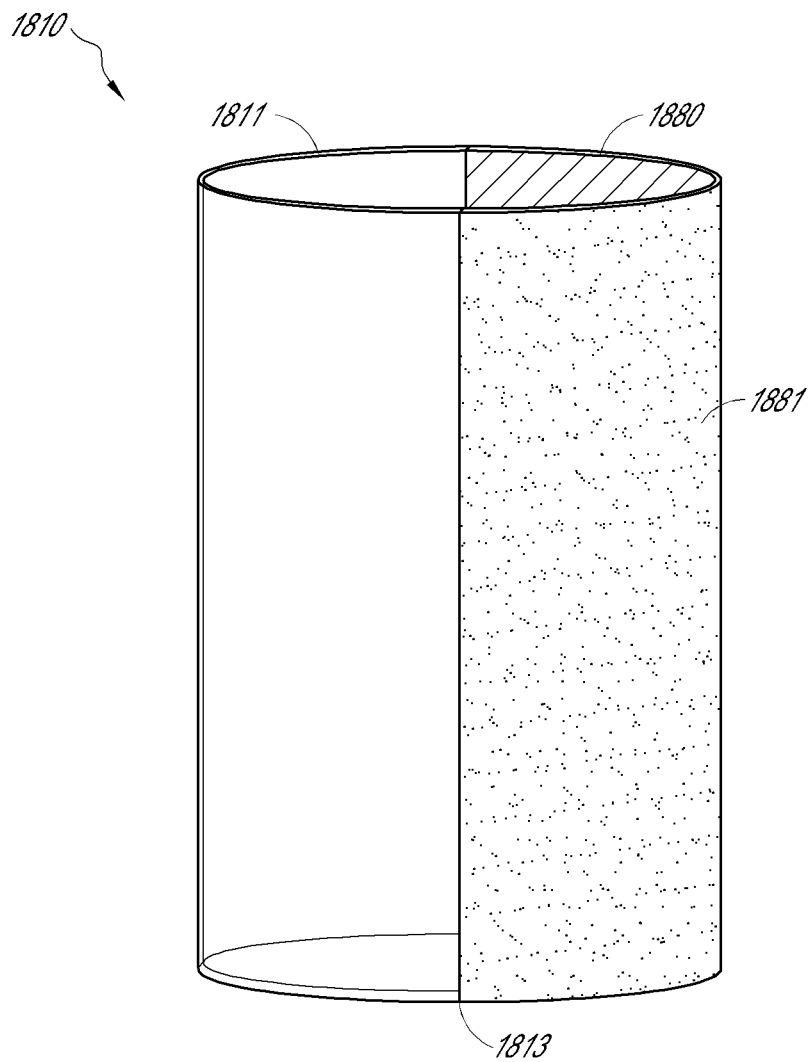
FIG. 18 illustrates an embodiment of a light collector having a reflector assembly with a high-emissivity coating.

FIG. 18 illustrates an embodiment of a light collector 1810 having a transparent portion and a reflector assembly. Depending on material characteristics of the reflector assembly 1880, portions of the reflector assembly, or any other component of the light collector 1810, may absorb thermal energy from light (e.g., infrared light) coming in contact therewith. For example, in certain embodiments, the reflector assembly can include aluminum. Heat absorbed by such a structure may contribute to undesirable heating within a light collector, daylighting system and/or interior of a building.

In certain embodiments, an outside surface 1881 of at least a portion of the light collector 1810 is coated or covered with a layer of material having a relatively high thermal emissivity factor, serving to aid in the transfer of thermal energy away from the light collector 1810. The emissivity factor is related to the ratio of absorbed thermal energy to reflected and/or transmitted thermal energy. In certain embodiments, the outside surface 1881 is in thermal communication with a material having an emissivity factor of greater than about 0.9. Furthermore, high-emissivity material(s) used in connection with a light collector such as that depicted in FIG. 18 may have varying emissivity characteristics for different wavelengths of light. For example, a material can be configured to transmit a relatively high percentage of energy in the infrared spectrum. Material in thermal communication with outer surface 1881 can be in the form of paint or other coating, or can be a sheet or film disposed in the surface 1881. Other components of the daylighting system, such as a daylight-reflective tube, can be coated or lined with high-emissivity materials in order to draw heat away from the interior of the daylighting system, thereby reducing unwanted heating. Examples of types of high-emissivity materials that can be used in connection with a daylighting apparatus include various types of glass (e.g., frosted glass), plastic, sheet metal, paint, powders (e.g., graphite powder), lacquer, or tape (e.g., electrical tape) having high-emissivity characteristics, and can be black or white in color. High-emissivity material can be used in connection with various embodiments of light collecting assemblies as disclosed herein, including light collectors of having any suitable shape or including any suitable material or combination of materials.

Figure 19:
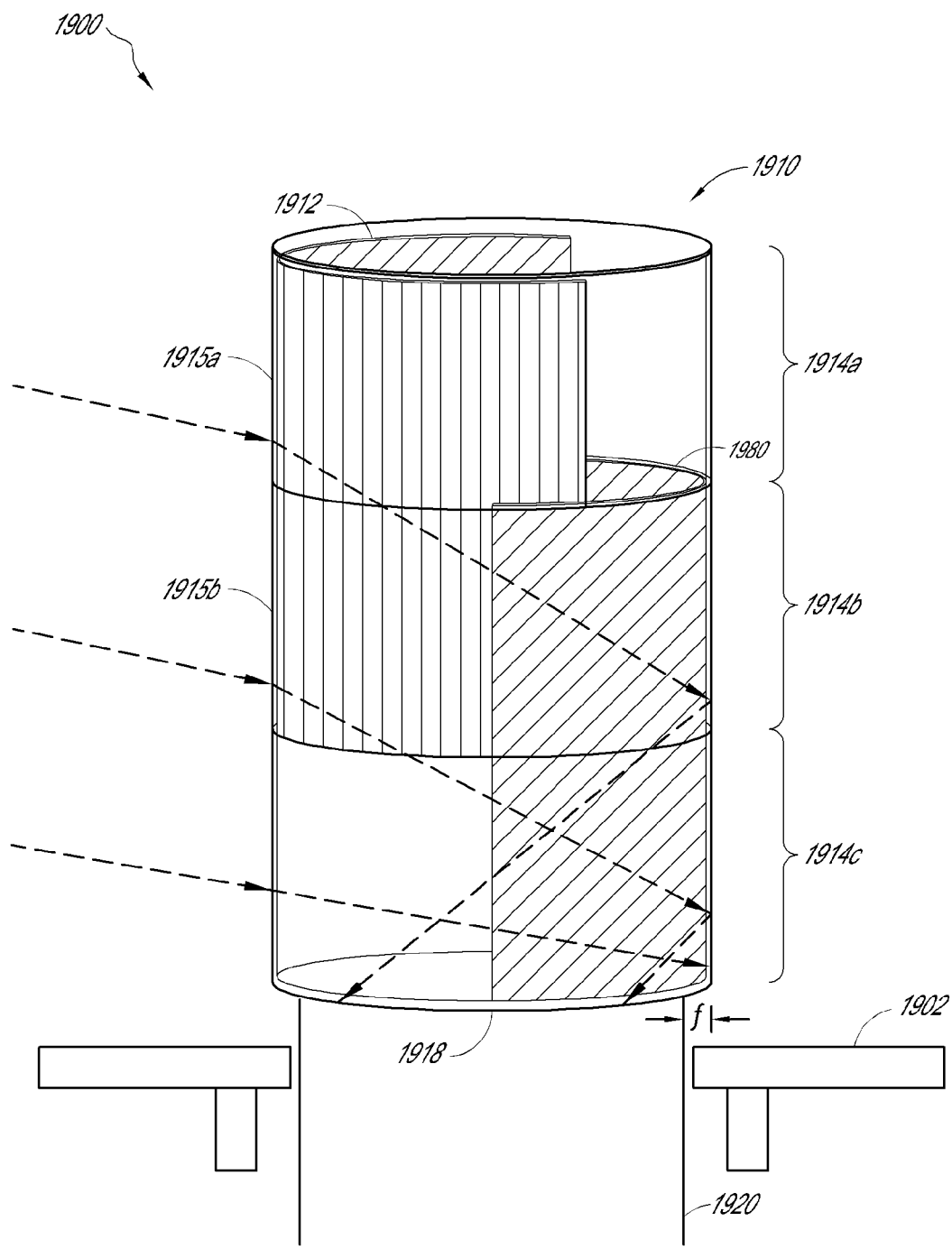
FIG. 19 illustrates an embodiment of a daylighting device including a light collector having prismatic and reflective optical elements.

FIG. 19 illustrates an embodiment of a light collector 1910 in a daylighting system 1900. The light collector includes three vertically-arranged optical zones, or segments 1914a, 1914b and 1914c. The segments 1914a, 1914b and 1914c can be of uniform height, or the heights of different segments may vary. In certain embodiments, each segment is approximately 10-15 inches tall. For example, the segments 1914a, 1914b and 1914c can be approximately 12 inches in height. In certain embodiments, a bottom segment, such as segment 1914c, has a greater height than other segments to accommodate attachment of the light collector 1910 to a flashing. For example, the bottom segment 1914c may have a height of about 14 inches. Furthermore, the light collector can include a lip, or fringe f that extends beyond the opening of the tube 1920.

Although three segments are shown, a light collector can include any suitable number of segments or portions. In certain embodiments, different segments can be associated with different optical refraction, transmission and/or reflection characteristics. For example, in some embodiments, at least a portion of the top segment 1914a is associated with a prismatic element 1915a, or other optical element or elements. As shown in FIG. 19, the prismatic element 1915a may extend around more than half the circumference of a generally cylindrically-shaped light collector 1900. In certain embodiments, the prismatic element 1915a extends around approximately 270° of the cylindrically shaped collector 1910, and may generally face a direction from which daylight enters the collector 1910, as shown. Providing prismatic element that extends beyond 180° of the perimeter of the light collector may allow for capture of a wider spectrum of light. In certain embodiments, the prismatic element 1915a circumscribes the entire perimeter of the light collector 1910, at least with respect to the top segment 1914a.

In the depicted embodiment, the middle segment 1914b is also associated with light turning structure 1915b, such as prismatic element. A prismatic element 1915b can extend along approximately 50%, or 180°, of the perimeter of the light collector 1910, as shown, and can generally face a direction from which daylight enters the collector 1910. The prismatic elements 1915a and 1915b can be a unitary structure, or can be separate sheets or films. The prismatic elements 1915a and 1915b can include prisms having similar or different light-turning characteristics. In certain embodiments, one prismatic element 1915a is configured to turn daylight to a greater degree than another prismatic element 1915b.

Collector segment 1914c can be associated with light-turning prismatic structure, or may not, depending on collector 1910 characteristics. For example, as shown, the segment 1914c may allow for daylight to pass into the collector 1910 without substantially altering an angle of the daylight with respect to a horizontal plane. Therefore, the segment 1915c may present a substantially clear acrylic material without additional optical elements to daylight entering therein.

In addition to, or in place of, a light turning structure 1915a, 1915b, one or more portions or segments of the light collector 1910 can be associated with a reflector assembly 1980. In the embodiment shown in FIG. 19, a reflector 1980 is disposed in proximity to an inside surface of the sidewall of the light collector 1910 along portions of light collector segments 1914b and 1914c. It can be desirable to include one or more reflectors in at least a lower portion of the light collector 1910 because light striking a reflector in a lower portion of the light collector 1910 can be more likely to reflect into the tube 1920 rather than exiting out the front side of the collector. For example, in an embodiment including a reflector in the top segment 1914a, light striking the reflector at a point in segment 1914a may have a further distance to travel in order to reach the tube 1920. Therefore, the angle of trajectory may carry the light out of the collector before it reaches the tube 1920. In certain embodiments, the top segment 1914a of the collector 1920 is not associated with the reflector assembly 1980. In some embodiments, a light collector 1910 having a reflector 1980 can have a height that is greater than or equal to about twice the height of a light collector that does not have a reflector. In some embodiments, a light collector 1910 having a reflector 1980 limits the collection of light at sun azimuthal angles greater than 60 to 90 degrees when the reflector 1980 is facing south.

Reflective characteristics of the reflector 1980 may vary in different portions or segments of the reflector. Furthermore, while FIG. 19 shows the reflector as a singular piece, the reflector can include distinct pieces or structures. The reflector 1980, or portions of the thereof may span any suitable portion of the circumference, or perimeter, of the light collector 1910. In certain embodiments, the reflector 1980 spans approximately 180° of the light collector's perimeter, as shown. The reflector can be positioned generally at a back portion of the light collector with respect to a direction from which daylight enters the light collector 1910. In certain embodiments, and under certain daylight conditions, the light collector 1910 and reflector 1980 can be configured such that approximately 85% or more of the light entering the collector will be directed to the reflector 1980, and can allow for the removal of infrared light from daylight before the daylight enters the tube 1920.

Figure 13:
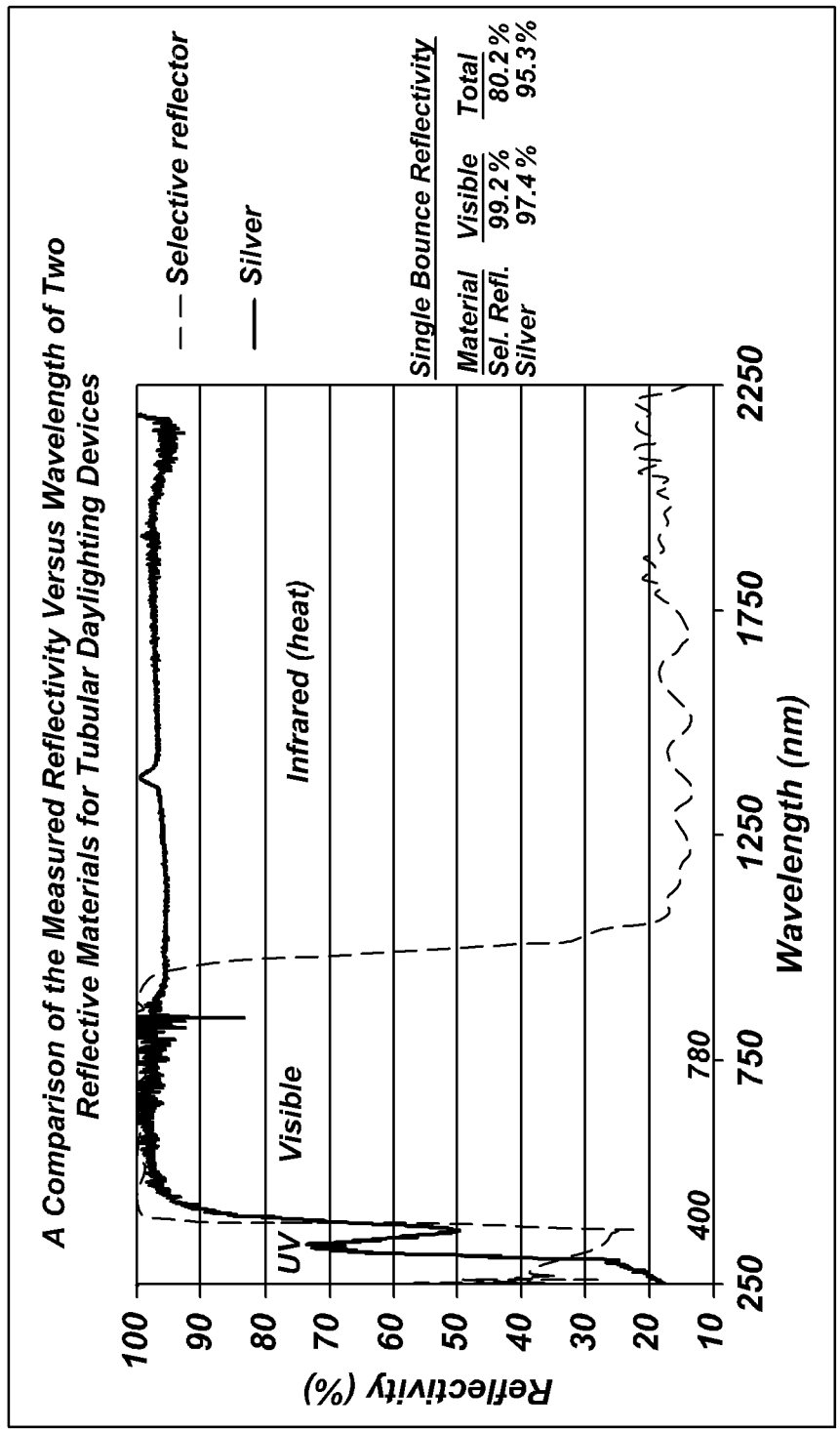
FIG. 13 is a graph showing reflectivity profiles of two different reflective materials.

The reflector 1980 can be constructed from a material system that has high luminous reflectance and high transmittance of infrared light. The finish of the reflector 1980 can be specular or have any desired level of specularity. Wavelength-selective light reflectance can be achieved using any suitable materials. Examples of wavelength-selective material systems include dielectric coatings and/or multi-layer films that use small differences in refractive index between many layers of the film to achieve desired optical properties. Multi-layer films can include coextruded stacks of two or more polymers having different refractive indices. FIG. 13 shows the reflectivity profile of a multi-layer film, 3M Daylighting Film DF2000MA, which is available from the 3M Company of Maplewood, Minn., USA. This polymeric film is an example of a multi-layer film that can be part of the material system of the reflector 1980 or as the reflector 1980. The reflectivity profile of a enhanced silver coating is also shown. The multi layer film provides very high reflectivity in the visible region, having a luminous reflectance greater than 99% when measured with respect to CIE Illuminant $D_{65}$. The film has substantially lower reflectivity of infrared light; the reflectivity of infrared light is less than or equal to about 20%. The reflectivity of ultraviolet light is also substantially lower than the reflectivity of visible light. In comparison, the enhanced silver coating has lower luminous reflectance and infrared light reflectivity greater than 90%.

After infrared light is transmitted through a wavelength-selective reflector 1980, the infrared light can transmit through an infrared transmissive material, such as, for example, acrylic or PET. In some embodiments, the sidewall of the collector 1910 is made from an infrared transmissive material. In some embodiments, the infrared light is absorbed after transmitting through a wavelength-selective reflector 1980. In such embodiments, the infrared light can be absorbed by an infrared absorbing paint or adhesive positioned to receive the infrared light after it transmits through the reflector 1980. In some embodiments, the infrared paint or adhesive is adhered to a metal substrate. The metal substrate can form a portion of the sidewall of the collector that is not transparent (e.g., a portion of the sidewall configured to face away from direct sunlight). The metal substrate can be heated by the paint or adhesive when it absorbs infrared light, and the infrared light can then be reemitted in a direction generally away from the daylighting aperture 1918 and the tube 1920.

In some embodiments, an exterior surface of the portion of the sidewall of the collector 1910 that absorbs infrared light has high emissivity. High emissivity can be obtained by applying a high emissivity material, such as paint, to the surface, or by performing another type of surface treatment, such as anodization. At least some anodized metals exhibit high emissivity, and such metals can form at least a portion of the exterior surface of the light collector 1910. A high emissivity surface can also be provided on the outside surface of the tube 1920, which can permit the tube 1920 to readily reemit infrared radiation absorbed by the tube 1920 out of the daylighting device 1900.

In certain embodiments, the daylighting device 1900 is configured to reject heat during summer months, when the solar altitude is higher, and to direct heat into the building being illuminated by the daylighting device during winter months, when the solar altitude is lower.

A daylighting device incorporating a light collector in accordance with the embodiments described above can be configured to maintain an illumination level within a range of about +/−20% of a given value throughout a period of interest, such as the hours from around 9:00 am to 3:00 pm. Furthermore, such a device may provide around 20,000 lumens of light, or more, at a given time, depending on, among other things, external daylight conditions.

Table A lists potential illumination performance values of two daylight collectors in accordance with one or more embodiments disclosed herein. The performance can be measured by total daylight transmission (in lumens) through the daylighting device into an interior space of a building or structure. In some embodiments, the illumination performance of a daylight collector can be determined by measuring the luminous flux of daylight through the daylighting aperture of a daylight collector. Table A provides potential results with respect to a range of daylight conditions/solar altitudes. In some embodiments, a daylighting collector is configured to direct greater than or equal to about 30,000 lumens and/or greater than or equal to about 40,000 lumens of daylight into a daylighting aperture when the daylighting collector is exposed to sunlight at a solar altitude of 40°.

TABLE A

| Solar altitude (degrees from horizontal) | Light Transmitted - 23" cylinder with 45°/10° prismatic element at top (lumens) | Light Transmitted - 27" cylinder with 45°/10° prismatic element at top (lumens) |
| --- | --- | --- |
| 20 | 18,284 | 24,900 |
| 30 | 27,799 | 36,857 |
| 40 | 30,318 | 40,730 |
| 50 | 28,575 | 38,219 |
| 60 | 24,523 | 33,928 |
| 70 | 23,155 | 32,558 |
| 80 | 10,394 | 16,494 |

Figure 20:
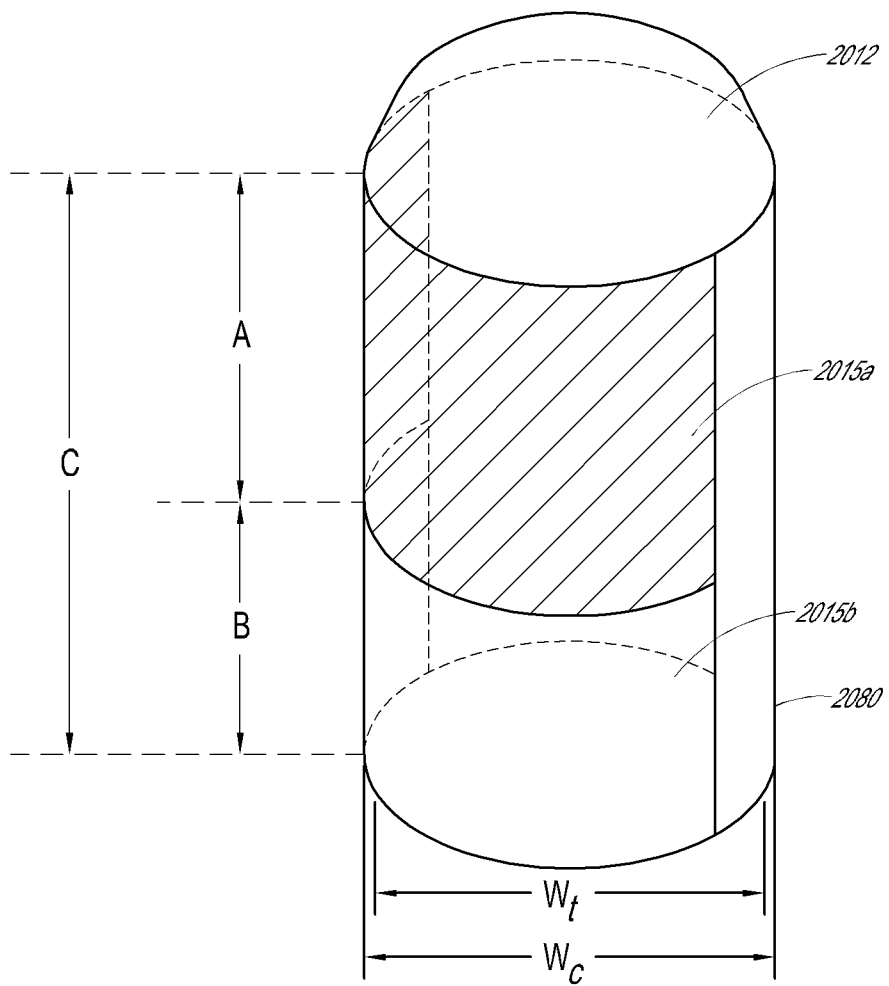
FIG. 20 illustrates a perspective view of an embodiment of a light collector.

FIG. 20 illustrates an embodiment of a light collector 2010. The figure shows two vertically-arranged zones, or segments, 'A' and 'B.' The segments A and B can be of uniform height, or the heights of different segments may vary. In certain embodiments, the segment A represents a portion of a vertical side portion of the light collector 2010 that is associated with prismatic structure 2015a, at least over some portion of the circumference or perimeter of the side portion. Furthermore, the segment B may represent a portion of the vertical side portion of the light collector 2010 that is not associated with prismatic structure. The light collector 2010 can include a back half-cylinder portion, which can include reflective properties. For example, at least a portion of the back portion 2080 can include or be associated with aluminum, or other reflective material. In certain embodiments, the vertical walls of the light collector 2010 can be configured to capture daylight having a solar altitude of approximately 20°-50°.

The light collector 2010 can include a substantially clear dome-shaped cover portion 2012. The cover portion 2012 can be configured to capture daylight having a solar altitude of approximately 30°-90°. The combination of vertical sidewall and dome-shaped cover portions may provide improved performance during both clear and cloudy weather conditions.

In general, with respect to a light collector embodiments in accordance with FIG. 20, greater performance a lower solar elevations (e.g., 20°-40°) can be achievable with higher aspect ratios (i.e., height of vertical cylinder portion C vs. width of tube opening $w_t$). With respect to daylight at solar altitudes greater than 40°, the horizontal daylight-collection surface provided by the cover 2012 may provide the majority of daylight capture. In certain embodiments, an aspect ratio of approximately 1.9 will produce approximately 40% or more improvement in captured light at 20° and/or 30° when compared to an aspect ratio of approximately 1.3 or less. However, performance at 40°-90° may remain approximately steady for both configurations.

Figure 21A:
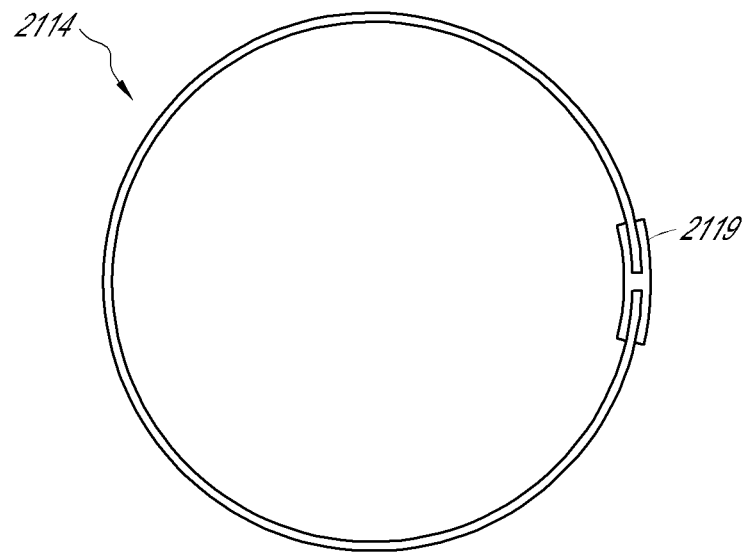
FIG. 21A illustrates an embodiment of a light collector formed from a singular panel.

Design considerations in manufacturing daylight collectors in accordance with one or more embodiments disclosed herein may take into consideration various cost-related and/or other factors. For example, different materials that can be selected for incorporation in a daylight collector can be available at different prices. Furthermore, different materials may have different physical properties contributing to the performance and/or ease of manufacturing of various components of the collector. Therefore, certain information about the physical dimensions of a light collector can be useful in making design or other decisions. Table B provides example physical specifications for a number of possible embodiments of daylight collectors. The dimensions provided in Table B correspond to the areas and dimensions called out in FIG. 20. Table B provides size and area information that can be helpful in assessing cost/performance issues associated with the respective embodiments, as well as other embodiments.

figured such that fabrication and/or installation of the collector are simplified. For example, the side portion of a light collector 2014 can be formed from a substantially flat or curved sheet that can be formed into a cylinder, as shown by the top view of FIG. 21A. Such a configuration, as installed, may have a singular vertical seam that can be, for example, secured by an attaching member 2019, or in any other suitable way.

Figure 21B:
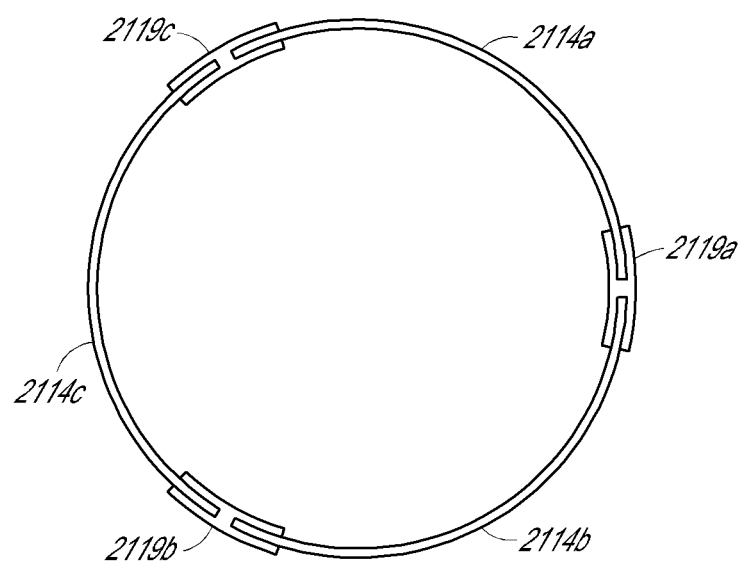
FIG. 21B illustrates a top view of an embodiment of a portion of a light collector having a circumference that includes multiple curved panels.

FIG. 21B shows top view of an embodiment of a portion of a light collector, wherein the circumference of the light collector is made up of multiple segments 2114a, 2114b and 2114c, that can be attached in any suitable manner, such as by using attaching members 2119a, 2119b, and/or 2119c. With respect to the embodiments depicted in both FIGS. 21A and 21, a flat, slightly curved, or otherwise shaped top cover can be placed on the cylinder top.

Figure 22:
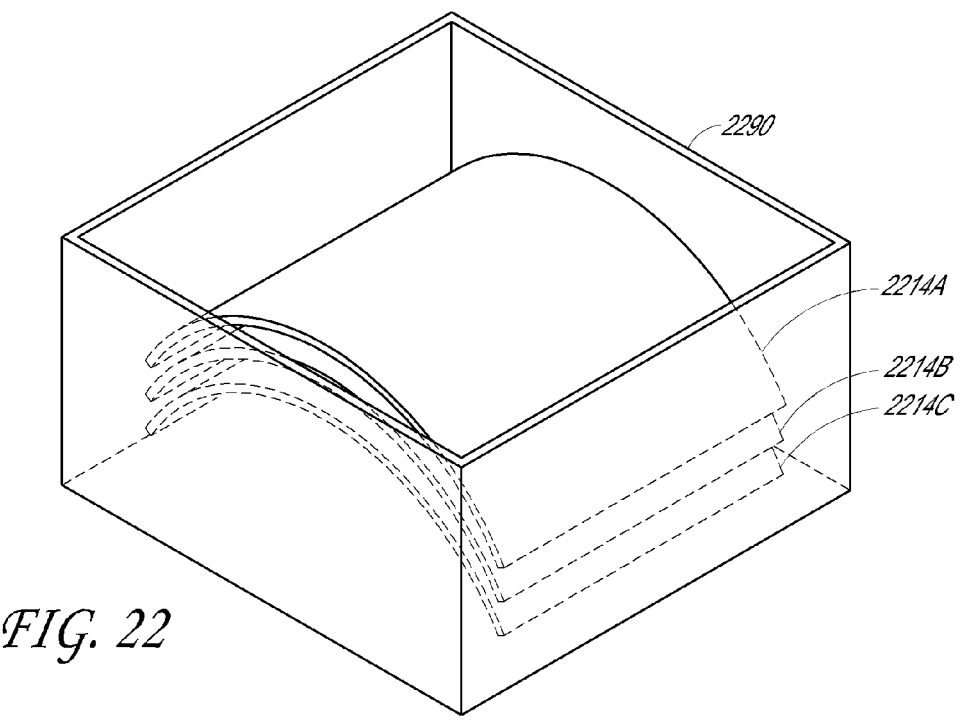
FIG. 22 illustrates a packaging configuration for an embodiment of one or more curved light collector panels.
Figure 23:
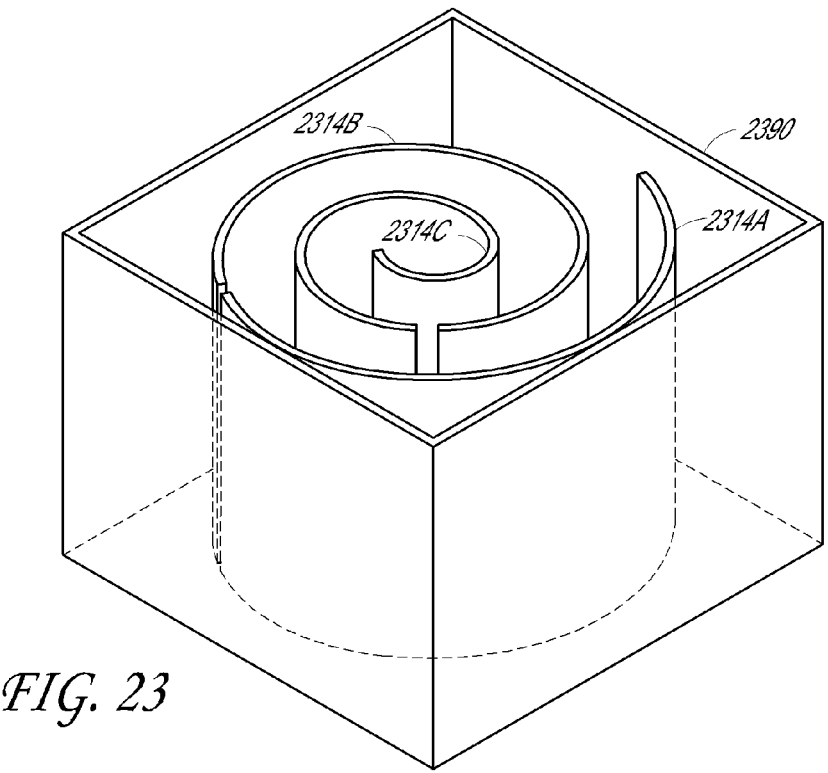
FIG. 23 illustrates a packaging configuration for an embodiment of one or more curved light collector panels.

FIG. 22 illustrates a packaging configuration for one or more curved light collector portions. For example, with respect to the embodiments of FIGS. 20 and 21, which can include one or more curved panels that can be formed into a cylinder or other shape, such panels can be disposed in a stacked configuration in a package 2290 for shipping, transporting, storing, or for other purposes. FIG. 23 illustrates a packaging configuration in which one or more curved panels 2314a, 2314b, 2314c are concentrically arranged in a package 2390. The packages shown can allow space for prismatic and/or reflective components, or any other components, associated with a daylighting device. Such packaging configurations may reduce cost and/or effort associated with the manufacture, transportation, and/or installation of one or more components of a daylighting device.

At least some of the embodiments disclosed herein may provide one or more advantages over existing lighting systems. For example, certain embodiments effectively allow increased daylight capture through the use of a light collector incorporating one or more prismatic elements and/or reflective elements. As another example, some embodiments provide techniques for directing light to a building interior using

TABLE B

| Collector Type | High Aspect Ratio | Scaled-Up High Aspect Ratio | Low Aspect Ratio | Scaled-Up Low Aspect Ratio |
|---|---|---|---|---|
| Cylinder Diameter ($W_c$) | 23" | 27.3" | 23" | 27.3" |
| Tube Diameter ($W_t$) | 21" | 25.3" | 21" | 25.3" |
| A | 23.6" | 28.2" | 10.4" | 12.5" |
| B | 18.0" | 21.1" | 18.0" | 21.1" |
| C | 41.6" | 49.3" | 28.4" | 33.6" |
| Cover (2012) Surface Area | 2.88 ft$^2$ | 4.09 ft$^2$ | 2.88 ft$^2$ | 4.09 ft$^2$ |
| Front Prismatic Portion (2015a) Area | 5.9 ft$^2$ | 8.40 ft$^2$ | 2.6 ft$^2$ | 3.7 ft$^2$ |
| Front Prismatic Portion (2015a) Size | 23/6" × 36.1" | 28.2" × 42.8" | 10.4" × 36.1" | 12.5" × 42.8" |
| Back Portion (2080) Area | 10.4 ft$^2$ | 14.7 ft$^2$ | 7.2 ft$^2$ | 10.0 ft$^2$ |
| Back Portion (2080) Size | 41.6" × 36.1" | 49.3" × 42.8" | 28.4" × 36.1" | 33.6" × 42.8" |

The values provided in Table B are approximations of various possible daylight collector dimensions, and are not limiting on the scope of the disclosure in any way. Furthermore, although certain values are provided in the table, the respective collector dimensions need not conform in any way to such values, and can be configured to be any suitable dimensions. As shown in the table, construction of a daylight collector may demand more than 8 ft$^2$ of prismatic material, as well as more than 14 ft$^2$ of reflective back portion material. Therefore, costs associated at least with such materials/areas may represent a significant factor in daylight collector design.

In certain embodiments, a light collector in accordance with one or more embodiments described herein can be cona light collector having a height greater than the width of an opening in the building, or of a base aperture of the collector, through which light is transmitted. The height of the collector may provide an increased target light capture area. Certain embodiments may provide additional benefits, including reducing the incident angle at the diffuser of light propagating through the daylighting device, which can result in the diffuser operating with higher optical efficiency.

OTHER EMBODIMENTS

The following list has example embodiments that are within the scope of this disclosure. The example embodiments that are listed should in no way be interpreted as limiting the scope of the disclosure. Various features of the example embodiments that are listed can be removed, added, or combined to form additional embodiments, which are part of this disclosure:

1. An at least partially transparent light-collecting device configured to direct daylight through a collector base aperture and into an interior of a building when the light-collecting device is installed on a roof of the building, the device comprising:
   a top cover portion;
   a substantially vertical sidewall portion configured to support the top cover portion above an upper end of the substantially vertical sidewall portion and to define a collector base aperture at a lower end of the substantially vertical sidewall portion, wherein the substantially vertical portion has a height that extends between the top cover portion and the collector base aperture, and wherein the substantially vertical portion is configured to receive a substantial amount of daylight during mid-day hours;
   a prismatic element associated with the substantially vertical sidewall portion and configured to turn at least a portion of daylight received by the vertical portion towards the collector base aperture; and
   a reflector associated with the substantially vertical portion configured to reflect the portion of daylight towards the opening;
   wherein the light-collecting device is configured to be positioned over an opening in a roof of a building and is configured to direct daylight into the opening in the roof when the light-collecting device is installed as part of a daylighting device installation.

2. The device of embodiment 1, wherein the height of the vertical portion is greater than the width of the collector base aperture.

3. The device of embodiment 2, wherein an aspect ratio of the height of the vertical portion to the width of the collector base aperture is greater than 1.2 to 1.

4. The device of any of embodiments 1-3, wherein the top cover portion is substantially flat.

5. The device of any of embodiments 1-4, wherein the top cover portion comprises a dome-shaped surface.

6. The device of any of embodiments 1-5, wherein the top cover portion comprises a cone-shaped surface.

7. The device of any of embodiments 1-6, wherein the vertical portion comprises a plurality of vertically-arranged segments, including a top segment, a middle segment, and a bottom segment.

8. The device of embodiment 7, wherein the top segment is associated with first optical elements having first light-turning characteristics and the middle portion is associated with second optical elements having second light-turning characteristics.

9. The device of any of embodiments 7-8, wherein the bottom segment is not associated with light-turning optical elements.

10. The device of any of embodiments 7-9, wherein the top, middle, and bottom segments are each approximately 5 to 10 inches in height.

11. The device of any of embodiments 7-10, wherein the top, middle, and bottom segments are each a uniform height.

12. The device of any of embodiments 7-11, wherein the reflector is at least partially transparent with respect to infrared light.

13. The device of any of embodiments 7-12, wherein the vertical portion is substantially cylindrically shaped.

14. The device of embodiment 13, wherein the vertical portion comprises a first semi-circle portion that is at least partially transparent, and a second semi-circle portion that is at least partially reflective.

15. The device of embodiment 14, wherein the second semi-circle portion comprises a surface in thermal communication with a high-emissivity material configured to facilitate radiation of heat away from the second semi-circle portion.

16. The device of embodiment 14, wherein the high-emissivity material comprises paint with an emissivity value greater than or equal to about 0.9.

17. The device of any of embodiments 7-16, wherein the vertical portion is integrated with an internally reflective tube configured to channel light towards an interior space of the building.

18. The device of any of embodiments 7-17, wherein the height of the vertical portion is between 35 and 45 inches.

19. The device of any of embodiments 7-18, wherein the width of the collector base aperture is between 20 and 25 inches.

20. An at least partially transparent light-collecting device for directing daylight into a building interior, the device comprising:
   a top cover portion;
   a base aperture having a width and configured to be disposed adjacent to an opening of a building;
   a substantially vertical portion having a height, the vertical portion extending between the top portion and the base aperture and configured to receive daylight when installed on a building; and
   a reflector associated with the vertical portion, the reflector configured to reflect at least a portion of daylight received by the vertical portion towards the opening;
   wherein the vertical portion is associated with a prismatic element configured to turn the portion of daylight received by the vertical portion towards the opening; and
   wherein the height of the vertical portion is greater than the width of the opening of the building.

21. The device of embodiment 20, wherein the vertical portion has a rectangular cross-sectional shape.

22. The device of any of embodiments 20-21, wherein the vertical portion has a substantially elliptical cross-sectional shape.

23. The device of embodiment 22, wherein the vertical portion is constructed out of a single sheet, wherein two ends of the sheet are joined to form a single vertical seam.

24. The device of embodiment 22, wherein the vertical portion comprises a plurality of curved sheets that are configured to be joined together to form a shape having a substantially elliptical cross section.

25. The device of any of embodiments 20-24, wherein the vertical portion has a cross-sectional perimeter comprising one or more curved portions and one or more straight portions.

26. A method of illuminating an interior of a building, the method comprising:
   receiving daylight on a substantially vertical surface;
   refracting the received daylight towards an opening in a building using a prismatic element disposed within a light-collecting device; and
   reflecting the daylight towards the opening using a reflector.

27. The method of embodiment 26, wherein reflecting the daylight comprising reflecting the daylight after it is refracted using the prismatic element.

28. A method of manufacturing an at least partially transparent light-collecting device for directing daylight into a building interior, the method comprising:
- providing a light collecting device configured to receive daylight on a substantially vertical surface when installed on a building having an opening;
- disposing a prismatic element within the light collecting device; and
- disposing a reflector adjacent to a wall of the light collecting device;
- wherein the prismatic element is configured to turn at least a portion of daylight received on the substantially vertical surface towards the opening, and the reflector is configured to reflect the portion of daylight towards the opening.

Discussion of the various embodiments disclosed herein has generally followed the embodiments illustrated in the figures. However, it is contemplated that the particular features, structures, or characteristics of any embodiments discussed herein can be combined in any suitable manner in one or more separate embodiments not expressly illustrated or described. It is understood that the fixtures disclosed herein can be used in at least some systems and/or other lighting installations besides daylighting systems.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined only by a fair reading of the claims that follow.

What is claimed is:

1. A passive light-collecting device for directing sunlight into a building interior, the device comprising:
- a top cover portion;
- a base aperture having a width and configured to be disposed adjacent to an opening of a building;
- a prismatic element comprising a prismatic surface and a surface opposite the prismatic surface, wherein the prismatic element is configured to turn sunlight incident on the top cover portion towards the base aperture, and wherein the surface of the prismatic element opposite the prismatic surface is parallel to the top cover portion;
- a substantially vertical portion having a height that extends between the top cover portion and the base aperture and is configured to receive sunlight; and
- a reflector associated with the vertical portion configured to reflect at least a portion of received sunlight towards the base aperture.

2. The device of claim 1, further comprising a prismatic element associated with the vertical portion and configured to turn at least a portion of sunlight received by the vertical portion towards the base aperture.

3. The device of claim 1, wherein the vertical portion comprises a plurality of vertically-arranged segments, including at least an upper segment and a lower segment, wherein the upper segment is associated with a first prismatic element having first light-turning characteristics and the lower segment is clear.

4. A passive light-collecting device for directing sunlight into a building interior, the device comprising:
- a base aperture having a width and configured to be disposed adjacent to an opening of a building;
- a top cover portion comprising a prismatic element, wherein the prismatic element is configured to turn sunlight incident on the top cover portion towards the base aperture;
- a substantially vertical portion having a height that extends between the top cover portion and the base aperture and is configured to receive sunlight; and
- a reflector associated with the vertical portion configured to reflect at least a portion of received sunlight towards the base aperture.

5. An at least partially transparent light-collecting device configured to direct daylight through a collector base aperture and into an interior of a building when the light-collecting device is installed on a roof of the building, the device comprising:
- a top cover portion;
- a sidewall portion configured to support the top cover portion above an upper end of the sidewall portion and to define a collector base aperture at a lower end of the sidewall portion, wherein the sidewall portion has a height that extends between the top cover portion and the collector base aperture, and wherein the height of the sidewall portion is greater than a width of the collector base aperture, wherein at least a portion of daylight transmitted through the sidewall portion is received in the collector base aperture; and
- an optical element having one or more reflective interior surfaces configured to receive a portion of daylight propagating through the collector base aperture and to turn the portion of daylight such that an exit angle of the portion of daylight is closer to vertical than an entrance angle of the portion of daylight.

6. The device of claim 5, wherein the optical element is configured to turn the portion of daylight such that the exit angle is less than or equal to about 45 degrees from vertical.

7. The device of claim 5, wherein the optical element is configured to prevent at least a portion of daylight from exiting the light-collecting device at an angle between about 45 degrees and about 60 degrees from vertical.

8. The device of claim 5 further comprising a diffuser configured to be positioned inside of the building and configured to receive the daylight directed towards a bottom end of the collector base aperture.

9. The device of claim 8, wherein the optical element is configured to increase the optical efficiency of the diffuser.

10. The device of claim 8, wherein the optical element is configured to align at least a portion of daylight propagating through the light-collecting device such that the portion of daylight reaches the diffuser at greater angles with respect to a base of the diffuser than the portion of daylight would without the optical element.

11. The device of claim 5 further comprising a reflector configured to turn at least a portion of the daylight towards the collector base aperture.

12. The device of claim 11, wherein the reflector has a luminous reflectance greater than or equal to about 0.95 when measured with respect to CIE Illuminant $D_{65}$, wherein the reflector is associated with the sidewall portion.

13. The device of claim 5, wherein the sidewall portion is substantially vertical.

14. The device of claim 5, wherein an aspect ratio of the height of the sidewall portion to the width of the collector base aperture is greater than 1.2 to 1.

15. The device of claim 14, wherein the aspect ratio is greater than 1.5 to 1.

16. The device of claim 14, wherein the aspect ratio is greater than 2 to 1.

17. The device of claim 5 further comprising at least one prismatic element positioned to receive daylight transmitted through the sidewall portion, the at least one prismatic element configured to turn at least a portion of daylight received towards the collector base aperture.

18. The device of claim 5, wherein the top cover portion includes a second prismatic element configured to refract daylight passing through the top cover portion.

19. A method of illuminating an interior of a building, the method comprising:
   receiving daylight on a sidewall portion of a light collecting device, wherein the sidewall portion has a height that extends between a top cover portion of the light collecting device and a collector base aperture, and wherein the height of the sidewall portion is greater than a width of the collector base aperture; and
   turning a portion of the daylight, using an optical element, such that an exit angle of the portion of daylight is closer to vertical than an entrance angle of the daylight.

20. The method of claim 19, wherein the exit angle of the light less than or equal to about 45 degrees from vertical.

21. The method of claim 19, turning the daylight towards the collector base aperture using a prismatic film disposed within the light-collecting device, wherein the collector base aperture is in a substantially horizontal plane.

22. The method of claim 19, wherein the sidewall portion is substantially vertical.

* * * * *